US006996623B1

(12) United States Patent
Kawano et al.

(10) Patent No.: US 6,996,623 B1
(45) Date of Patent: Feb. 7, 2006

(54) RECEPTION DISPLAY APPARATUS AND METHOD FOR DISPLAYING SCREEN PARTIALLY WITH CERTAIN TIMING EVEN WHEN ALL DATA FOR THE SCREEN HAS NOT BEEN RECEIVED, AND COMPUTER-READABLE RECORD MEDIUM RECORDING SUCH RECEPTION DISPLAY PROGRAM

(75) Inventors: Shinji Kawano, Hiroshima (JP); Toshitaka Hanaura, Hiroshima (JP); Eiji Ueda, Hiroshima-ken (JP); Futoshi Nakabe, Hiroshima (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 1053 days.

(21) Appl. No.: 09/650,029

(22) Filed: Aug. 28, 2000

(30) Foreign Application Priority Data

Sep. 8, 1999 (JP) ................................ 11-254767

(51) Int. Cl.
*G06F 15/16* (2006.01)
*G06F 11/00* (2006.01)
*H04N 7/025* (2006.01)

(52) U.S. Cl. .......................... 709/231; 714/48; 725/32; 725/33

(58) Field of Classification Search ................ 709/231, 709/217, 219, 230, 245; 725/109, 112, 113, 725/110, 131, 139, 151, 32–33; 714/48; 345/719; 715/501.1, 513
See application file for complete search history.

(56) References Cited

U.S. PATENT DOCUMENTS

| | | | | |
|---|---|---|---|---|
| 5,754,153 | A * | 5/1998 | Mizutome et al. | 345/97 |
| 5,822,679 | A * | 10/1998 | Koike et al. | 725/116 |
| 6,061,056 | A * | 5/2000 | Menard et al. | 345/704 |
| 6,073,180 | A * | 6/2000 | Onoda et al. | 709/234 |
| 6,118,440 | A * | 9/2000 | Tsunoda | 345/213 |
| 6,339,786 | B1 * | 1/2002 | Ueda et al. | 709/217 |
| 6,452,943 | B1 * | 9/2002 | Furuya | 370/468 |

(Continued)

FOREIGN PATENT DOCUMENTS

JP 1120979 5/1989

(Continued)

OTHER PUBLICATIONS

Fletcher, W.; Ardron, P. "Application of MPEG2 in the receiver" MPEG-2—What it is and What it isn't, IEE Colloquium on, Jan. 24, 1995 pp.: 8/1-8/5.*

(Continued)

*Primary Examiner*—Marc D. Thompson
*Assistant Examiner*—Tam T. Phan

(57) ABSTRACT

A reception display apparatus for receiving data blocks repeatedly transmitted from a broadcasting station at regular intervals and displaying a screen image based on the received data blocks. Each of the data blocks including a data section. Data to be displayed as the screen image is divided into a plurality of data sections. The reception display apparatus comprises: a reception means for receiving the data blocks; a data judgment means for judging whether the data section in each received data block is normal; a storage means for storing every data section judged as normal by the data judgment means without storing data sections judged as abnormal; a condition judgment means for judging, before all data sections to be displayed as the screen image are stored in the storage means, whether a condition for displaying the screen image is satisfied; and a display means for displaying, when the condition judgment means judges that the condition is satisfied, a part of the screen image using data sections currently stored in the storage means.

15 Claims, 35 Drawing Sheets

U.S. PATENT DOCUMENTS

| | | | | |
|---|---|---|---|---|
| 6,501,472 | B1 * | 12/2002 | Hunt et al. | 345/428 |
| 6,658,153 | B1 * | 12/2003 | Nakagawa et al. | 382/233 |

FOREIGN PATENT DOCUMENTS

| | | | |
|---|---|---|---|
| JP | 04-119785 | | 4/1992 |
| JP | 7123076 | | 5/1995 |
| JP | 08272752 | * | 10/1996 |
| JP | 10-243366 | | 9/1998 |
| JP | 11-088850 | | 3/1999 |

OTHER PUBLICATIONS

Jeong-Hyun Park "The monitoring of MPEG program singals in digital DBS system" ISCE '97—Proceedings of 1997 IEEE International Symposium on Consumer Electronics , Dec. 2-4, 1997 pp.: 9-14.*

Gold, M.P.; Brockhurst, D.M. "Error correction strategies for data broadcasting" Broadcasting Covention, 1988. IBC 1988., International , Sep. 23-27, 1988 pp.: 323-327.*

[Partial English Translation] for "Notification of Reasons for Refusal," Issued on Mar. 2, 2004 for corresponding Japanese Application No. 2000-273912, pp. 1-6.

JP 04-119785 (Apr. 21, 1992) with English Abstract - Full Document English Translation - Gomikawa, Takao; "Teletext Broadcasting Receiver"; Translated Service performed by USPTO Translations Branch.*

* cited by examiner

FIG. 21

2101

2102

```
<HEAD>
<TITLE>TOUR GUIDE TO HIROSHIMA</TITLE>
</HEAD>
<BODY BGCOLOR="silver" TEXT="black">
<H1><STRONG><U>TOUR GUIDE TO HIROSHIMA</U></H1>
</STRONG></BODY></H4>
<BLOCKQUOTE>
<UL>
</BLOCKQUOTE>
<L1><H4><A HREF="Shiro. html">HIROSHIMA CASTLE</A>
<L1><A HREF="Shukkei. html">SHUKKEI-EN GARDEN</A>
<L1><A HREF="Heiwa. html">A-BOMB DOME AND
        PEACE MEMORIAL PARK</A>
<L1><A HREF="Kyuujo. html">HIROSHIMA MUNICIPAL
        BASEBALL STADIUM</A>
<L1><A HREF="Miyajima. html">MIYAJIMA AND ITSUKUSHIMA
        SHRINE</A></H4>
</UL>
<HR>
<H4><OL>
<L1><A HREF="HiroShu. html">TOUR GUIDE TO HIROSHIMA
        AREA</A>
<L1><A HREF="HiroKen. html">TOUR GUIDE TO HIROSHIMA
        PREFECTURE</A>
</OL><H4>
</HTML>
```

FIG. 29

| | RECEIVED TOTAL SIZE | RECEIVED ERROR TOTAL SIZE | UNKNOWN SIZE BLOCK COUNTER | DETAILED INFORMATION COUNTER | BLOCK 1 | | BLOCK 2 | | BLOCK 3 | | BLOCK 4 | | BLOCK 5 | |
|---|---|---|---|---|---|---|---|---|---|---|---|---|---|---|
| | | | | | TYPE | SIZE | TYPE | SIZE | TYPE | SIZE | TYPE | SIZE | TYPE | SIZE |
| EXAMPLE 1 | 400 | 50 | 0 | 3 | REAL | 200 | TEMPORARY | 50 | REAL | 200 | -- | -- | -- | -- |
| EXAMPLE 2 | 40 | 300 | 0 | 3 | REAL | 20 | TEMPORARY | 300 | REAL | 20 | -- | -- | -- | -- |
| EXAMPLE 3 | 400 | 0 | 3 | 4 | TEMPORARY | 0 | TEMPORARY | 0 | REAL | 400 | TEMPORARY | 0 | -- | -- |
| EXAMPLE 4 | 400 | 50 | 0 | 5 | TEMPORARY | 10 | TEMPORARY | 20 | REAL | 200 | TEMPORARY | 20 | REAL | 20 |

| | REAL BLOCK SIZE | | | | | MINI-MUM | MAXI-MUM | AVER-AGE | ESTIMATED VALUE | NECESSARY VALUE |
|---|---|---|---|---|---|---|---|---|---|---|
| EXAM-PLE 1 | 100 | 200 | 100 | 100 | 200 | 100 | 200 | 140 | 140 | 200 |
| EXAM-PLE 2 | 100 | 800 | 300 | 600 | 200 | 100 | 800 | 400 | 400 | 800 |
| EXAM-PLE 3 | 400 | 400 | 400 | 400 | 100 | 100 | 400 | 340 | 340 | 400 |

RECEPTION DISPLAY APPARATUS AND METHOD FOR DISPLAYING SCREEN PARTIALLY WITH CERTAIN TIMING EVEN WHEN ALL DATA FOR THE SCREEN HAS NOT BEEN RECEIVED, AND COMPUTER-READABLE RECORD MEDIUM RECORDING SUCH RECEPTION DISPLAY PROGRAM

BACKGROUND OF THE INVENTION (1) Field of the Invention

The present invention relates to a reception display apparatus for receiving data and displaying a screen based on the received data. More particularly, the present invention relates to a technique for receiving and using broadcast data which is provided in a plurality of layers.

(2) Description of Related Art

In recent broadcast-type data communications, an idea similar to the OSI (Open Systems Interconnection) reference model for two-way communications has been introduced. That is to say, in most of recent standards, the broadcast data is provided in a plurality of layers and a separate protocol is used for each layer. Here, the broadcast-type data communications refer to one-way data communications in which data is transmitted from a transmission side to a reception side.

FIG. 36 shows a process in which the transmission side generates data blocks in a plurality of lower layers from a data block in a higher layer.

As shown in FIG. 36, a data block α in the higher layer is divided into a plurality of pieces of data A, B, C, . . . The protocol information is attached to the front and rear of each piece of divided data. The protocol information and a piece of divided data constitute a data block in a lower layer. The protocol information includes at least information necessary for reconstructing a data block in a higher layer. The protocol information attached to the front of data is referred to as header; and the protocol information attached to the rear of data is referred to as footer.

FIG. 37 shows a process in which the reception side generates a data block in a higher layer from data blocks in a plurality of lower layers.

As shown in FIG. 37, a data block a in the higher layer is reconstructed from each data block in lower layers based on the protocol information, the header and the footer.

If data were not divided into a plurality of data blocks in a lower layer, all data would have to be received again when a reception error occurs to a part of the data. For example, image files such as a JPEG (Joint Photographic Experts Group) files have a large data size. When receiving such a large file in a poor reception condition, it may take a lot of time before the file is received completely or the file may not be received completely since reception errors often occur to different portions in the file each time the file is transmitted. However, when such a large file is transmitted and received as a plurality of data blocks in a lower layer, even if a reception error occurs, only the data block to which the reception error has occurred needs to be transmitted again. In this case, the re-transmitted data block has a rarer chance to have a reception error since its data size is small. Furthermore, it does not take much time to receive the re-transmitted data block. As a result, the number of failures in receiving files decreases, and the time taken for completely receiving such a large file is also reduced drastically.

However, when the broadcast data is provided in a plurality of layers, the data in the highest layer, that is to say, the data which is reproduced for use by the user cannot be reproduced until the data blocks in the lower layers are completely received. This is because the data in the highest layer is reconstructed from the data blocks in the lower layers, in order from the lowest layer. That is to say, even if almost all the data blocks in a layer second to the highest layer are reconstructed, the data in the highest layer cannot be used unless the data blocks in the lower layer are completely reconstructed and the data in the highest layer is reconstructed from the data blocks.

For example, in a data broadcast service with which the user can watch information such as a weather forecast or a TV program guide by tracing user files such as HTML (Hyper Text Markup Language) files linked in a tree structure, user files as boughs and leaves cannot be referred to when user files as the stem or the boughs of them cannot be reproduced. However, the possibility that the user reaches the desired information increases if information having been received normally can be reproduced immediately even if the received information is only a part of a whole piece of information to be received.

SUMMARY OF THE INVENTION

It is therefore an object of the present invention to provide a reception display apparatus and method for receiving broadcast data which is generated through a plurality of layers, and being able to use the received data blocks even if all the necessary data blocks have not been received, and a computer-readable record medium recording such a reception display program.

The above object is fulfilled by a reception display apparatus for receiving data blocks which are repeatedly transmitted from a broadcasting station at regular intervals and displaying a screen image based on the received data blocks, each of the data blocks including a data section, and data to be displayed as the screen image being divided into a plurality of data sections, the reception display apparatus comprising: a reception means for receiving the data blocks; a data judgment means for judging whether the data section in each received data block is normal; a storage means for storing every data section judged as normal by the data judgment means without storing data sections judged as abnormal; a condition judgment means for judging, before all data sections to be displayed as the screen image are stored in the storage means, whether a condition for displaying the screen image is satisfied; and a display means for displaying, when the condition means judges that the condition is satisfied, a part of the screen image using data sections currently stored in the storage means.

With the above construction, it is possible to display a screen even if all data sections necessary for the screen have not been received. This enables the screen to be displayed at a point when a condition for displaying the screen is satisfied, increasing the possibility that the user reaches the desired information sooner.

In the above reception display apparatus, the data judgment means may generate, when having judged that a data section is not normal, information indicating that the data section is abnormal, and stores the information into the storage means, and the display means displays either a blank or a notice indicating abnormality of the data section, at a position in the screen image where the data section indicated as abnormal by the information stored in the storage means should be displayed.

With the above construction, the user can easily recognize the presence of a data section that has not been judged as normal.

In the above reception display apparatus, the screen image may be either displayed at once on a screen or viewed by scrolling by a user.

With the above construction, data sections constituting whole data corresponding to a screen of a predetermined size whole of which is either displayed at once or viewed by scrolling by a user are received and the screen of the predetermined size is displayed.

In the above reception display apparatus, the screen image may correspond to one of (1) a file including information used for referring to another file and (2) a Hyper Text file, and the display means displays a part of the screen image using data sections of one of the file including information used for referring to another file and the Hyper Text file currently stored in the storage means.

With the above construction, data sections constituting (1) a file including information used for referring to another file or (2) a Hyper Text file are received and the screen corresponding to the file is displayed.

In the above reception display apparatus, the condition for displaying the screen image used in the judgment by the condition judgment means may be that either (1) an instruction to display has been received from a user, or (2) the reception means has received data blocks including all data sections to be displayed as the screen image.

With the above construction, it is possible to use data sections currently stored when (1) an instruction to display has been received from a user, or (2) the reception means has received data blocks including all data sections constituting the whole data corresponding to the screen. This increases the possibility that the user reaches the desired information sooner.

The above object is also fulfilled by a reception display apparatus for receiving data blocks which are repeatedly transmitted from a broadcasting station at regular intervals and displaying a screen image based on the received data blocks, each of the data blocks including (1) a data section constituting original data to be displayed as the screen image and (2) protocol information indicating a position of the data section in the original data, the original data being divided into a plurality of data sections, the reception display apparatus comprising: a reception means for receiving the data blocks; a data judgment means for judging whether the data section in each received data block is normal; a storage means for storing (1) the protocol information included in each data block received by the reception means and (2) data sections judged as normal by the data judgment means, the storage means not storing data sections judged as abnormal, and each piece of stored protocol information showing correspondence to a data section from a same data block; a condition judgment means for judging, before all data sections to be displayed as the screen image are stored in the storage means, whether all pieces of protocol information for the screen image have been stored in the storage means; and a display means for, when the condition judgment means judges, that all pieces of protocol information for the screen image have been stored in the storage means, displaying a part of the screen image using the data sections currently stored in the storage means and all pieces of protocol information stored in the storage means.

With the above construction, it is possible to display a screen when all pieces of protocol information necessary for the screen have been provided. This enables currently stored data sections to be used, increasing the possibility that the user reaches the desired information sooner.

In the above reception display apparatus, the data judgment means may judge whether the protocol information in each received data block is normal and then judges for each data block that includes protocol information judged as normal whether the data section in the data block is normal, and the storage means stores every piece of protocol information judged as normal.

With the above construction, each piece of protocol information is stored even if a data section in the same data block is not normal. It is possible to display a screen using only normally received data sections at a point when all pieces of protocol information necessary for displaying the screen are provided.

In the above reception display apparatus, when a data section is not stored in the storage means and a piece of protocol information corresponding to the data section is stored in the storage means, the display means may display either a blank or a notice indicating abnormality of the data section, at a position in the screen image which is indicated by the piece of protocol information.

With the above construction, the user can easily recognize the position of a data section that has been judged as abnormal.

In the above reception display apparatus, each piece of protocol information may indicate a display area in the screen image corresponding to a data section included in the same data block, and the display means recognizes a display area on the screen image corresponding to a data section not stored in the storage means as a non-display area, and displays in the non-display area, which is indicated by a piece of protocol information corresponding to the data section not stored in the storage means, either a blank or information indicating that a data section has not been received normally.

With the above construction, the user can easily recognize the range of a data section that has been judged as abnormal.

In the above reception display apparatus, each piece of protocol information may further indicate a data size of a data section included in the same data block, and the display means generates a non-display area at a position in the screen image where a data section not stored in the storage means should be displayed, the non-display area having a size equivalent to a data size of the data section not stored in the storage means, and the data size and the position being indicated by a piece of protocol information stored in the storage means and corresponding to the data section not stored in the storage means.

With the above construction, it is possible to set the size of the non-display area in proportionate to the data size of the data section. This enables the user to easily estimate the size of the abnormal data from the size of the non-display area, and to update without a sense of incongruity the non-display area to a normal data section when it is received later.

In the above reception display apparatus, the received data blocks may belong to a lowest layer of a plurality of layers, the data blocks in the lowest layer being generated through the plurality of layers from the original data in a highest layer so that each data block in each layer includes (1) a data section which constitutes a data block in a next-higher layer and (2) a piece of protocol information which indicates a position of the data section included in the same data block, the highest layer not including protocol information but consisting of the original data which corresponds to the screen image, the receiving means receives each data block in the lowest layer, the data judgment means judges whether the data section in each received data block is normal, the storage means stores (1) the protocol information included in each data block received by the reception means and (2) every data section judged as normal by the data judgment means, the condition judgment means judges, before all data sections constituting a data block in a second-lowest layer are stored in the storage means, whether all pieces of protocol information necessary for the data block in the second-lowest layer have been stored in the storage means, when having judged so, reconstructs the data block in the second-lowest layer by using data sections in the lowest layer currently stored in the storage means and all corresponding pieces of protocol information in the lowest layer stored in the storage means, repeats such a reconstruction of a data block until the condition judgment means judges, before all data sections constituting the original data in the highest layer are reconstructed, that all pieces of protocol information necessary for reconstructing the original data in the highest layer have been prepared, and at this point of time, the display means displays a part of the screen image using the data sections in the second-highest layer having been reconstructed so far and the all pieces of protocol information in the second-highest layer necessary for reconstructing the original data in the highest layer.

With the above construction, it is possible to display a screen by reconstructing the original data through generation of a plurality of layers from the received data blocks.

The above object is fulfilled by a reception display method for receiving data blocks which are repeatedly transmitted from a broadcasting station at regular intervals and displaying a screen image based on the received data blocks, each of the data blocks including a data section, and data to be displayed as the screen image being divided into a plurality of data sections, the reception display method comprising: a reception step for receiving the data blocks; a data judgment step for judging whether the data section in each received data block is normal; a storage step for storing every data section judged as normal in the data judgment step without storing data sections judged as abnormal; a condition judgment step for judging, before all data sections to be displayed as the screen image are stored, whether a condition for displaying the screen image is satisfied; and a display step for, when the condition judgment step judges that the condition is satisfied, displaying a part of the screen image using currently stored data sections.

In the above reception display method, the data judgment step may generate, when having judged that a data section is not normal, information indicating that the data section is abnormal, and stores the information, and the display step displays either a blank or a notice indicating abnormality of the data section, at a position in the screen image where the data section indicated as abnormal by the stored information should be displayed.

The above object is also fulfilled by a reception display method for receiving data blocks which are repeatedly transmitted from a broadcasting station at regular intervals and displaying a screen image based on the received data blocks, each of the data blocks including (1) a data section constituting original data to be displayed as the screen image and (2) protocol information indicating a position of the data section in the original data, the original data being divided into a plurality of data sections, the reception display method comprising: a reception step for receiving the data blocks; a data judgment step for judging whether the data section in each received data block is normal; a storage step for storing (1) the protocol information included in each data block received in the reception step and (2) data sections judged as normal in the data judgment step, the storage step not storing data sections judged as abnormal, and each piece of stored protocol information showing correspondence to a data section from a same data block; a condition judgment step for judging, before all data sections to be displayed as the screen image are stored, whether all pieces of protocol information for the screen image have been stored; and a display step for, when the condition judgment step judges that all pieces of protocol information for the screen image have been stored, displaying a part of the screen image using the currently stored data sections and all pieces of stored protocol information.

The above object is also fulfilled by a computer-readable record medium recording a reception display program for receiving data blocks which are repeatedly transmitted from a broadcasting station at regular intervals and displaying a screen image based on the received data blocks, each of the data blocks including a data section, and data to be displayed as the screen image being divided into a plurality of data sections, the reception display program causing a computer to execute: a reception step for receiving the data blocks; a data judgment step for judging whether the data section in each received data block is normal; a storage step for storing every data section judged as normal in the data judgement judgment step without storing data sections judged as abnormal; a condition judgment step for judging, before all data sections to be displayed as the screen image are stored, whether a condition for displaying the screen image is satisfied; and a display step for, when the condition judgment step judges that the condition is satisfied, displaying a part of the screen image using currently stored data sections.

In the above computer-readable record medium, the data judgment step may generate, when having judged that a data section is not normal, information indicating that the data section is abnormal, and stores the information, and the display step displays either a blank or a notice indicating abnormality of the data section, at a position in the screen image where the data section indicated as abnormal by the stored information should be displayed.

The above object is also fulfilled by a computer-readable record medium recording a reception display program for receiving data blocks which are repeatedly transmitted from a broadcasting station at regular intervals and displaying a screen image based on the received data blocks, each of the data blocks including (1) a data section constituting original data to be displayed as the screen image and (2) protocol information indicating a position of the data section in the original data, the original data being divided into a plurality of data sections, the reception display program causing a computer to execute: a reception step for receiving the data blocks; a data judgment step for judging whether the data section in each received data block is normal; a storage step for storing (1) the protocol information included in each data block received in the reception step and (2) data sections judged as normal in the data judgment step, the storage step not storing data sections judged as abnormal, and each piece of stored protocol information showing correspondence to a data section from a same data block; a condition judgment step for judging, before all data sections to be displayed as the screen image are stored, whether all pieces of protocol information for the screen image have been stored; and a display step for, when the condition judgment step judges that all pieces of protocol information for the screen image have been stored, displaying a part of the screen image using the currently stored data sections and all pieces of stored protocol information.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 21 shows an HTML file sent by a general data broadcast service;

FIG. 29 shows four examples of the file block notification information;

DESCRIPTION OF THE PREFERRED EMBODIMENTS

Figure 1:
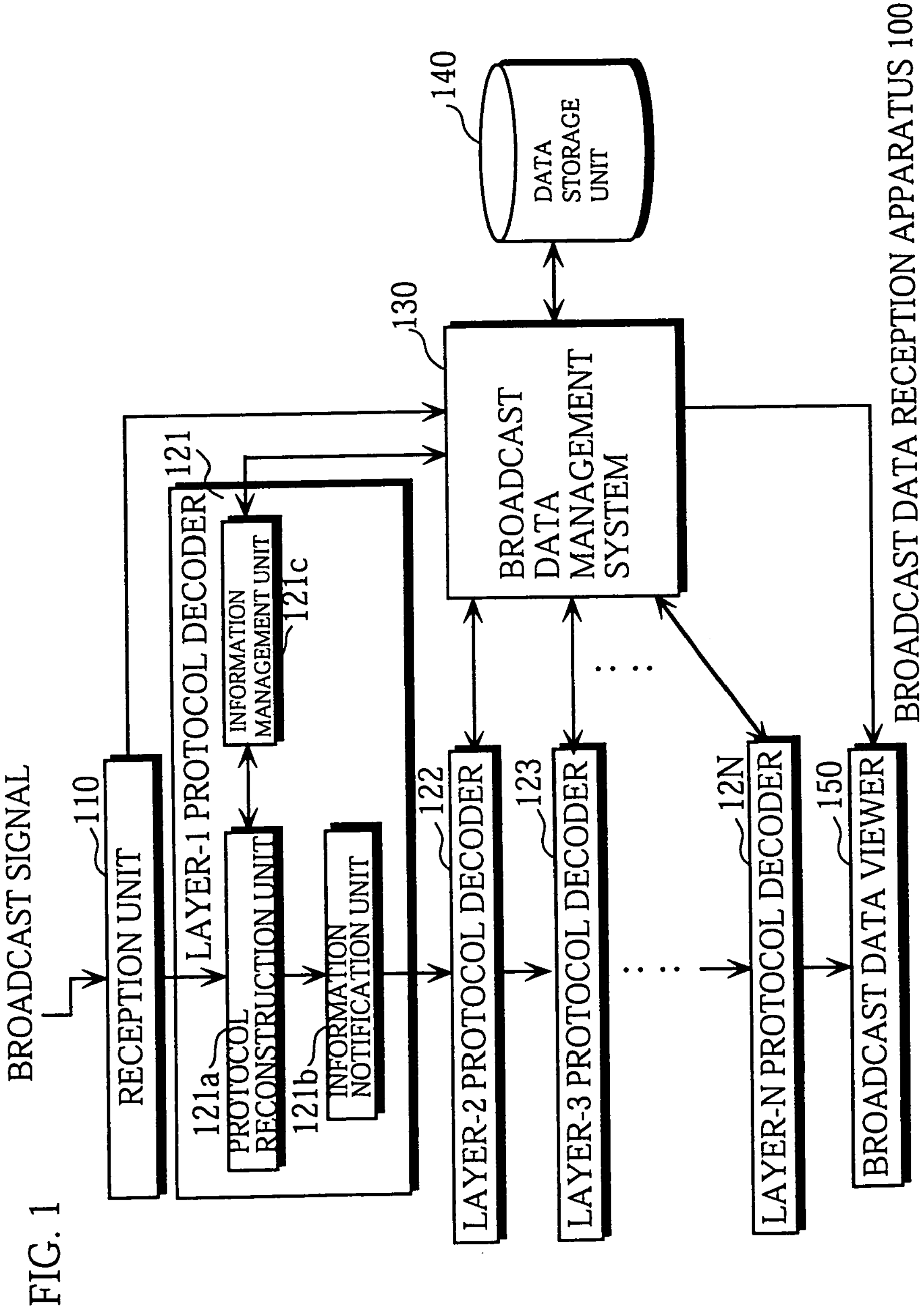
FIG. 1 shows the construction of the broadcast data reception apparatus which receives broadcast data and uses the received broadcast data.

The following are description of the present invention through specific embodiments thereof by way of referring to the drawings.

Embodiment 1

The broadcast data reception apparatus in Embodiment 1 of the present invention reconstructs data blocks in higher layers, though not completely normally, using only normally received data in the data blocks in lower layers even if some data in data blocks in the lowest layer (excluding the protocol information) has not been received normally. That is to say, at a point in time when all the protocol information necessary for reconstructing a data block in the higher layer has been received and stored, the data block is reconstructed using only normally received data in the data blocks in the lower layer.

Broadcast Data Reception Apparatus

FIG. 1 shows the construction of the broadcast data reception apparatus which receives broadcast data and uses the received broadcast data.

The broadcast data reception apparatus 100 shown in FIG. 1 includes a reception unit 110, a layer-1 protocol decoder 121 to a layer-N protocol decoder 12N (where N is an integer of 2 or greater), a broadcast data management system 130, a data storage unit 140, and a broadcast data viewer 150.

The layer-1 protocol decoder 121 includes a protocol reconstruction unit 121*a*, an information notification unit 121*b*, and an information management unit 121*c*.

Similarly, a layer-2 protocol decoder 122 to the layer-N protocol decoder 12N include a protocol reconstruction unit 122*a* to a protocol reconstruction unit 12Na, an information notification unit 122*b* to an information notification unit 12Nb, and an information management unit 122*c* to an information management unit 12Nc, respectively.

The reception unit 110 receives a broadcast signal via an antenna or the like, performs an error correction and decoding of the received broadcast signal, outputs data blocks in the lowest layer necessary for reconstructing broadcast data to the broadcast data management system 130 sequentially, and sends notifications of the above output of the data blocks to the protocol reconstruction unit 121*a* in the layer-1 protocol decoder 121 sequentially. In doing this, when the data part ("real data") of a data block in the lowest layer to be output to the broadcast data management system 130 is destroyed so hard due to a reception error or the like that an error correction cannot amend the defect, information indicating the defect instead of normal data and protocol information are output to the broadcast data management system 130. At this point in time, the normal data has not been received. Data blocks in the lowest layer failed to be received normally are received repeatedly until they are received normally. Normally received data blocks are output after they are received. Here, it is presumed that each piece of the protocol information is normal and is received normally and that it is judged so.

The layer-1 protocol decoder 121 reconstructs and decodes the protocol in accordance with the protocol of layer 1, the lowest layer, and generates first offset information used for reconstructing data blocks in layer 2 from a plurality of data blocks in the lowest layer, and sends the generated first offset information to the layer-2 protocol decoder 122 and the broadcast data management system 130.

The protocol reconstruction unit 121*a*, each time it receives a notification from the reception unit 110, judges whether enough data blocks in layer 1 to reconstruct a data block in layer 2 for reproducing desired broadcast data have been received. When having judged affirmatively, the protocol reconstruction unit 121*a* instructs the information management unit 121*c* to extract the protocol information which is necessary for reconstructing this data block in layer 2 from the data blocks in layer 1. The protocol reconstruction unit 121*a* previously preserves a protocol of layer 1 used for reconstructing the data blocks in layer 2. When instructing the information management unit 121*c* to extract the protocol information, the protocol reconstruction unit 121*a* attaches to the instruction a relative address of the protocol information to be extracted for the data blocks in layer 1, based on the previously preserved protocol.

Upon reception of the instruction from the protocol reconstruction unit 121*a*, the information management unit 121*c* instructs the broadcast data management system 130 to extract protocol information in each specified data block in layer 1, and sends each piece of the extracted protocol information to the protocol reconstruction unit 121*a*.

Upon receipt of the protocol information, the protocol reconstruction unit 121*a* based on the received protocol information generates the first offset information used to temporarily reconstruct the data block in layer 2 judged affirmatively, and sends the generated first offset information to the information notification unit 121*b*. The first offset information is also sent to the broadcast data management system 130 via the information management unit 121*c*. Here, the first offset information is composed of (1) information specifying a plurality of data blocks in layer 1 constituting the data block in layer 2 judged affirmatively and (2) information of relative addresses indicating the necessary data parts of the plurality of data blocks in layer 1.

Upon receipt of the first offset information from the protocol reconstruction unit 121*a*, the information notification unit 121*b* sends notifications sequentially to the protocol reconstruction unit 122*a* of the protocol decoder 122 in layer 2.

The layer-2 protocol decoder 122 to the layer-N protocol decoder 12N reconstruct and decode the protocols in accordance with the protocols of layer 2 to layer N, and generate second offset information to $N^{th}$ offset information used for reconstructing data blocks in layer 2 to layer N from a plurality of data blocks in the lowest layer based on the first offset information to (N−1) offset information, and send the generated second offset information to $N^{th}$ offset information to the layer-3 protocol decoder 123 to layer-N protocol decoder 12N and the broadcast data viewer 150. The generated second offset information to $N^{th}$ offset information are also sent to the broadcast data management system 130. Note that the data blocks in the highest layer, layer N are broadcast data that can be used by the user as they are.

The protocol reconstruction unit 122*a* to the protocol reconstruction unit 12Na reconstruct and decode the protocols in each layer in accordance with the notified protocol information.

The information notification unit 122*b* to the information notification unit 12Nb send the protocol information of the layer to the layer-3 protocol decoder 123 to the layer-N protocol decoder 12N in a layer which is higher than the present layer by one, respectively.

The information management unit 121*c* to the information management unit 12Nc manage information of the data blocks in the layers.

The broadcast data management system 130 manages data blocks in all the layers including those that have not been reconstructed.

The data storage unit 140 stores information managed by the broadcast data management system 130.

The broadcast data viewer 150 displays broadcast data automatically or based on an instruction from the user so that the user can refer to it.

Broadcast Data Management System

Figure 2:
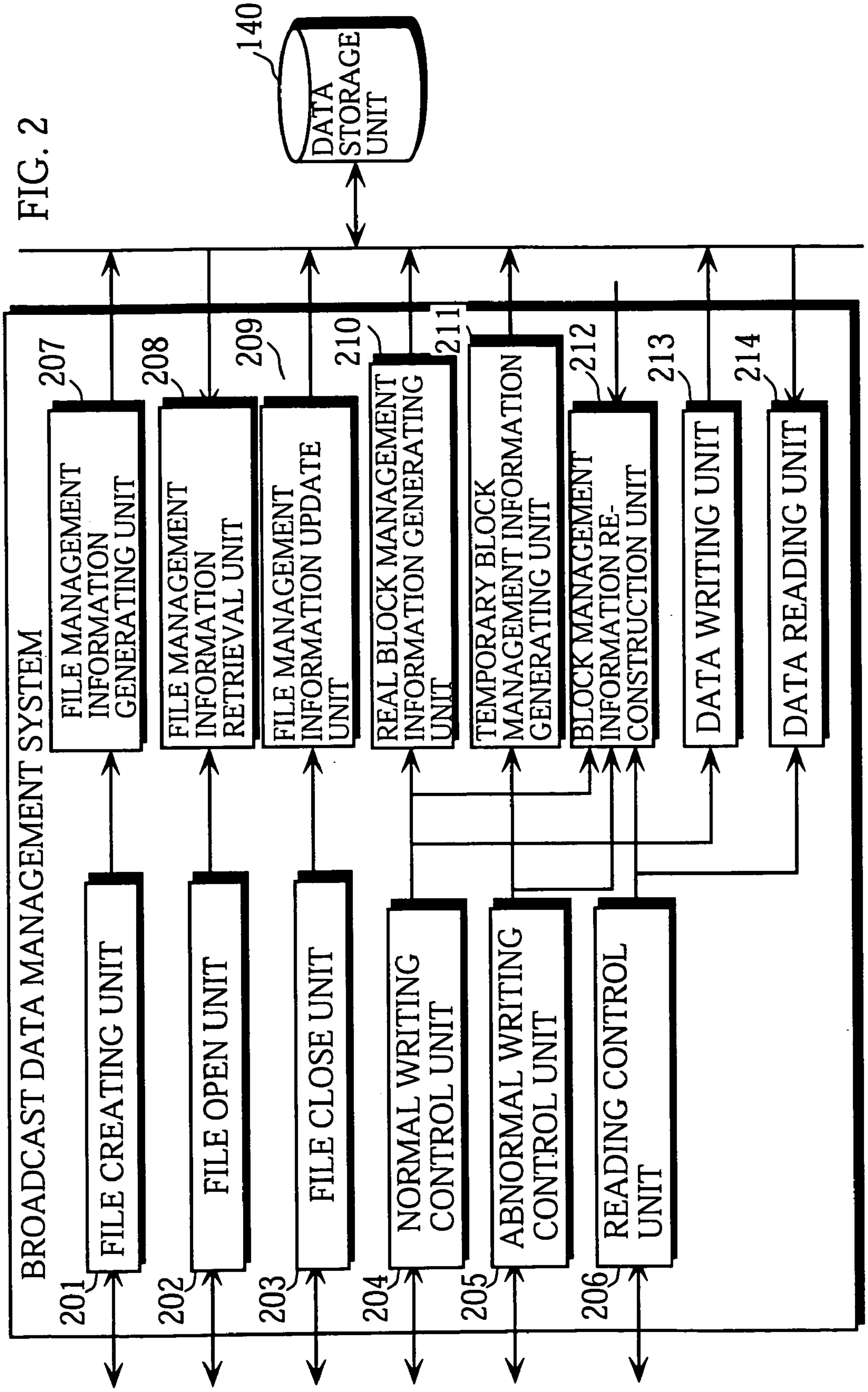
FIG. 2 shows a detailed construction of the broadcast data management system 130 shown in FIG. 1.

FIG. 2 shows a detailed construction of the broadcast data management system 130 shown in FIG. 1. Note that FIG. 2 also shows the data storage unit 140 shown in FIG. 1.

A file creating unit 201 receives a file creation request from the reception unit 110, instructs a file management information generating unit 207 to generate file management information and store the generated file management information in the data storage unit 140, and generates a file.

A file open unit 202 receives a file-open request from the information management unit 122*c* to the information management unit 12Nc, instructs a file management information retrieval unit 208 to retrieve file management information corresponding to a file to be opened in the data storage unit 140, and opens the existent file to be opened for use, based on the retrieved file management information.

A file close unit 203 receives a file-close request from the reception unit 110 and the information management unit 122*c* to the information management unit 12Nc, instructs a file management information update unit 209 to update file management information corresponding to a file to be closed in the data storage unit 140, and closes the file to be closed so that it cannot be used.

A normal writing control unit 204 receives a normal write request from the information management unit 12Nc, where the normal write request is issued when a piece of normally received data is registered with a file. The normal writing control unit 204 then instructs a block management information reconstruction unit 212 to obtain (1) a position where the normal data is to be written and (2) the size of the normal data, instructs a real block management information generating unit 210 to generate block management information for the normal data, and instructs a data writing unit 213 to write the normal data to the data storage unit 140.

An abnormal writing control unit 205 receives an abnormal write request from the information management unit 122*c* to the information management unit 12Nc, where the abnormal write request is issued when a piece of received data with a reception error is registered with a file. The abnormal writing control unit 205 then instructs the block management information reconstruction unit 212 to obtain (1) a position where the data is to be written when no reception error occurs and (2) the size of the data, and instructs a temporary block management information generating unit 211 to generate block management information for the abnormal data.

A reading control unit 206 receives a read request from the broadcast data viewer 150, where the read request is issued when data is read from a file. The reading control unit 206 then instructs a block management information reconstruction unit 212 to obtain (1) a position of the data to be read and (2) the size of the data to be read, and instructs a data reading unit 214 to read from the data storage unit 140.

Construction of Management Information

Figure 3:
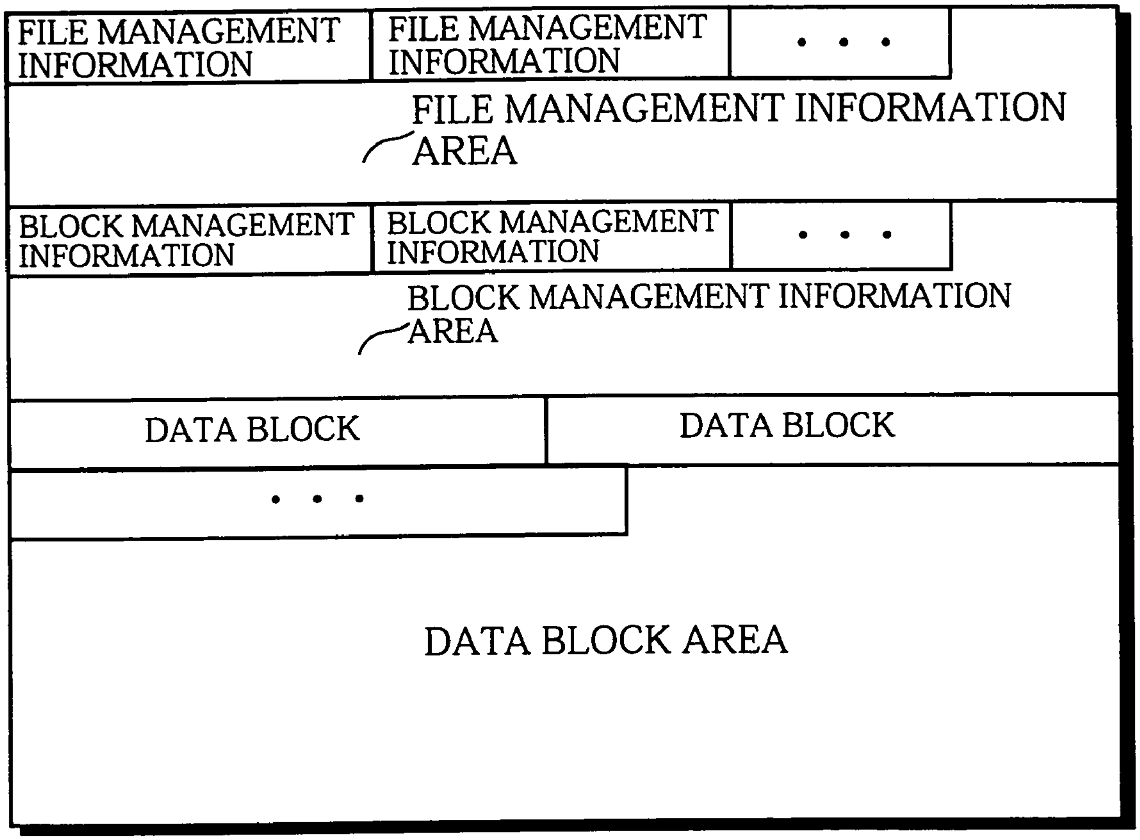
FIG. 3 shows the construction of the management information managed by the broadcast data management system 130 shown in FIG. 1.

FIG. 3 shows the construction of the management information managed by the broadcast data management system 130 shown in FIG. 1.

The management information shown in FIG. 3 is divided into a file management information area, a block management information area, and a data block area.

The file management information area includes a plurality of pieces of file management information which correspond to a plurality of files on a one-to-one basis.

The block management information area includes a plurality of pieces of block management information which correspond to a plurality of blocks on a one-to-one basis.

The data block area includes a plurality of data blocks.

Information of one file includes one piece of file management information, n pieces of block management information, and m data blocks, where n is a number being “1” or greater, and m is a number being n or greater.

Figure 4:
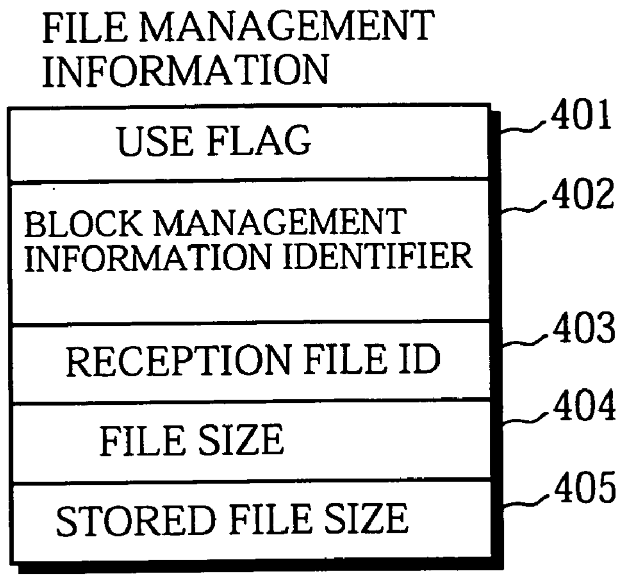
FIG. 4 shows the file management information.

FIG. 4 shows the file management information.

Figure 5:
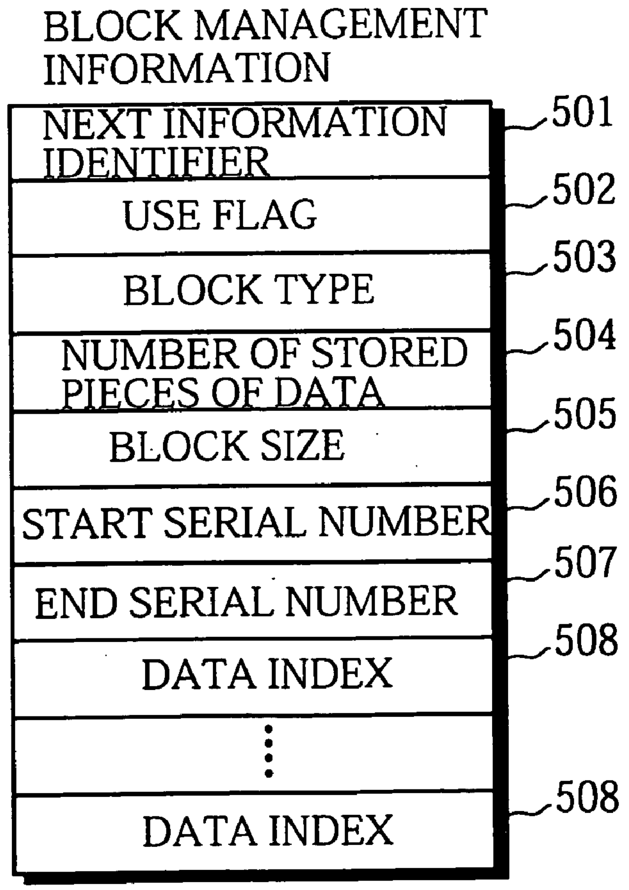
FIG. 5 shows the block management information.

FIG. 5 shows the block management information.

Here, the file management information is information used for managing each corresponding file in the data storage unit 140, and includes a use flag 401, a block management information identifier 402, a reception file ID 403, a file size 404, and a stored file size 405. The block management information is information used for managing each corresponding block in a file, and includes a next information identifier 501, a use flag 502, a block type 503, a number of stored pieces of data 504, a block size 505, a start serial number 506, an end serial number 507, and one or more data indexes 508.

The use flag 401 indicates whether an area for one piece of file management information is unused (usable) or used (unusable). The file management information generating unit 207 searches for an unused area when it generates a new piece of file management information, by using the use flag 401.

The block management information identifier 402 is an identifier of the block management information positioned at the start of the file managed by the file management information including the block management information identifier 402.

The reception file ID 403 is attribute information such as a file name used for identifying a file, and can be designed arbitrarily for each data broadcast system.

The file size 404 is a size of whole data when the whole data has been received normally.

The stored file size 405 is a size of normal data having been stored so far.

The file size 404 and the stored file size 405 are used to judge whether the whole data has been stored. It is judged that the whole data has been stored when the file size 404 and the stored file size 405 match each other.

The next information identifier 501 is an identifier of the block management information next to the block management information including the next information identifier 501.

The use flag 502 indicates whether an area for one piece of block management information is unused (usable) or used (unusable).

The block type 503 indicates whether the data block corresponding to the block type 503 has been received normally (real data) or a reception error has occurred to the data block (temporary data).

The number of stored pieces of data 504 indicates the number of data blocks registered with the block management information including the number of stored pieces of data 504, and matches the number of data indexes 508.

The block size 505 indicates a size of data registered with the block. When the block type 503 indicates that a reception error has occurred (temporary data) and the data size is unknown, the block size 505 is “0” indicating that the size is unknown.

The start serial number 506 is a serial number of the start data block among the stored ones.

The end serial number 507 is a serial number of the end data block among the stored ones.

Here, it is supposed that the serial numbers are updated in an ascending order, and that the block management information includes index information which shows all portions of the data block, except the protocol information, corresponding to all the serial numbers (from the start serial number 506 to the end serial number 507). It should be noted here that the serial numbers may take any form as far as they indicate uniquely the data blocks, and that the form may be determined for each data broadcast system.

The one or more data indexes 508 each store an index that shows the really received data. The one or more data indexes 508 may be information arbitrarily determined for each data broadcast system, such as addresses of the data blocks or identification numbers when the data blocks have fixed lengths. The number of data indexes is also arbitrary. The number of really registered data blocks can be obtained from the number of stored pieces of data 504.

Generation and Update of Management Information

The following is a description of generation and update of the information constituting a file.

Figure 6:
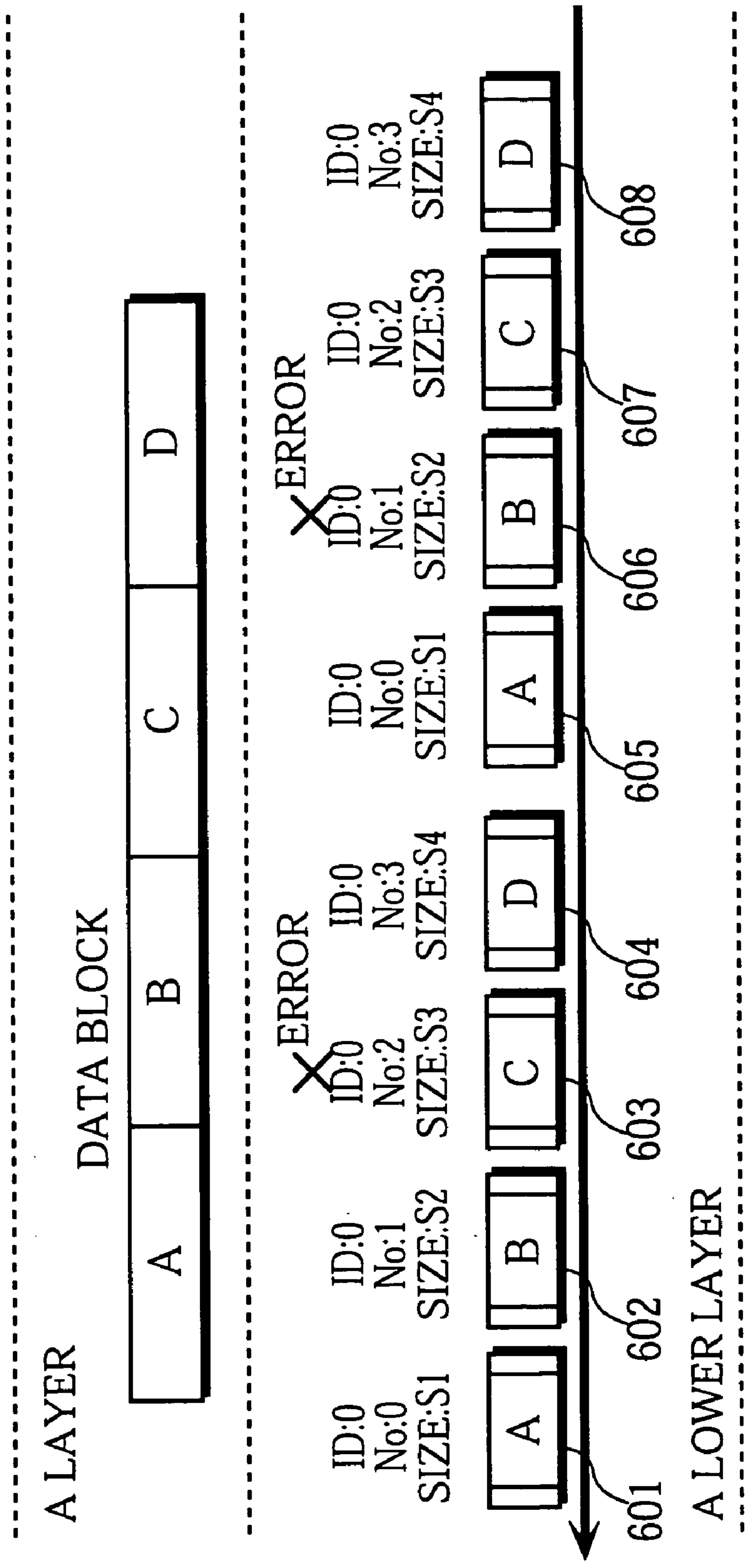
FIG. 6 shows a data reception of a file.

FIG. 6 shows a data reception of a file.

FIGS. 7 to 14 show the file management information and the block management information of the lowest layer which are generated and updated when data is received in the order shown in FIG. 6.

In the data reception shown in FIG. 6, the protocol information is attached to each data block (A to D) based on the protocol of the lowest layer, the protocol information including a file identification number of the protocol (represented as "ID:0" in FIG. 6), a serial number of a data block constituting the file (represented as "No:0", "No:1", "No:2", and "No:3" in FIG. 6), and each data size, and the data blocks A to D with the protocol information are transmitted twice in this order (represented as 601 to 608 in FIG. 6). As shown in FIG. 6, it is supposed that a reception error occurs to the data block C 603 and the data block B 606. Though not shown in the drawing, the protocol information of the data block As (601 and 604 in FIG. 6) includes flag information indicating the start of a file. The protocol information of the data block Ds (605 and 608 in FIG. 6) includes flag information indicating the end of a file. The size of the data blocks A to D excluding the protocol information is represented as "S1" to "S4", respectively.

(1) First, when the data block 601 is received normally without an error, a new file identification number "0" is obtained, a new piece of file management information is generated, the first piece of block management information is registered, and the data block 601 excluding the protocol information is stored.

Figure 7:
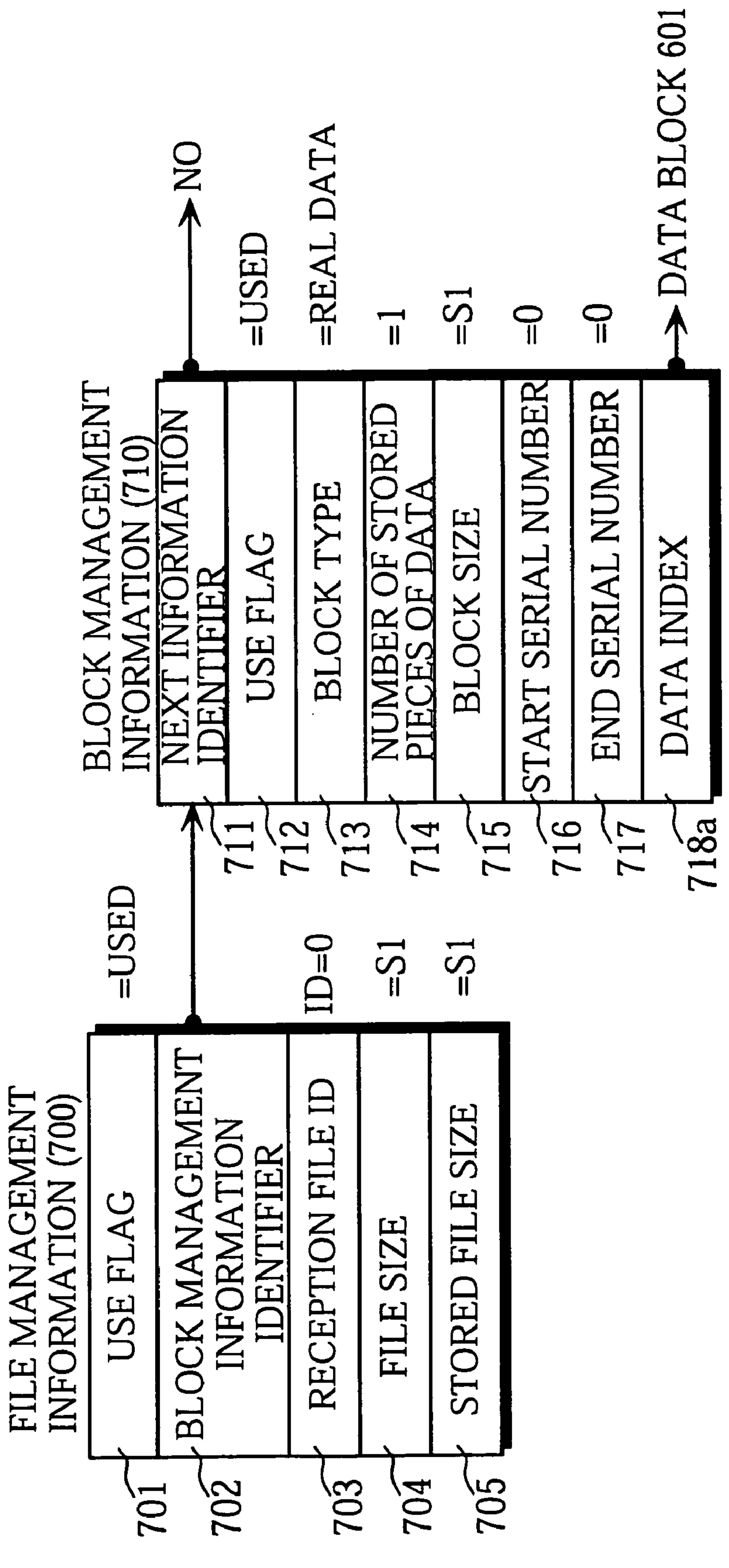
FIG. 7 shows the file management information and the block management information of the lowest layer which are generated and updated when data is received in the order shown in FIG. 6.

FIG. 7 shows each piece of management information generated in the above conditions.

To generate the new piece of file management information, an unused area for one piece of the file management information 700 is detected and secured (FIG. 7), the use flag 701 is set to "used", the reception file ID 703 is set to the file identification number "0" based on the protocol, and the file size 704 and the stored file size 705 are set to the size of the received data blocks.

To register the first data block, an unused area for one piece of the block management information 710 is secured (FIG. 7), the use flag 712 is set to "used", the block type 713 is set to "real data", the number of stored pieces of data 714 to "1", the block size 715 is set to "S1", and the start serial number 716 and the end serial number 717 are set to "0". The block management information identifier 702 of the file management information 700 is set to the identifier of the block management information 710, and the first data index 718*a* of the block management information 710 is set to the index information indicating the received data block 601 excluding the protocol information (FIG. 7).

(2) Secondly, when the data block 602 is received normally without an error, the block management information is registered and data of the data block 602 is stored.

Figure 8:
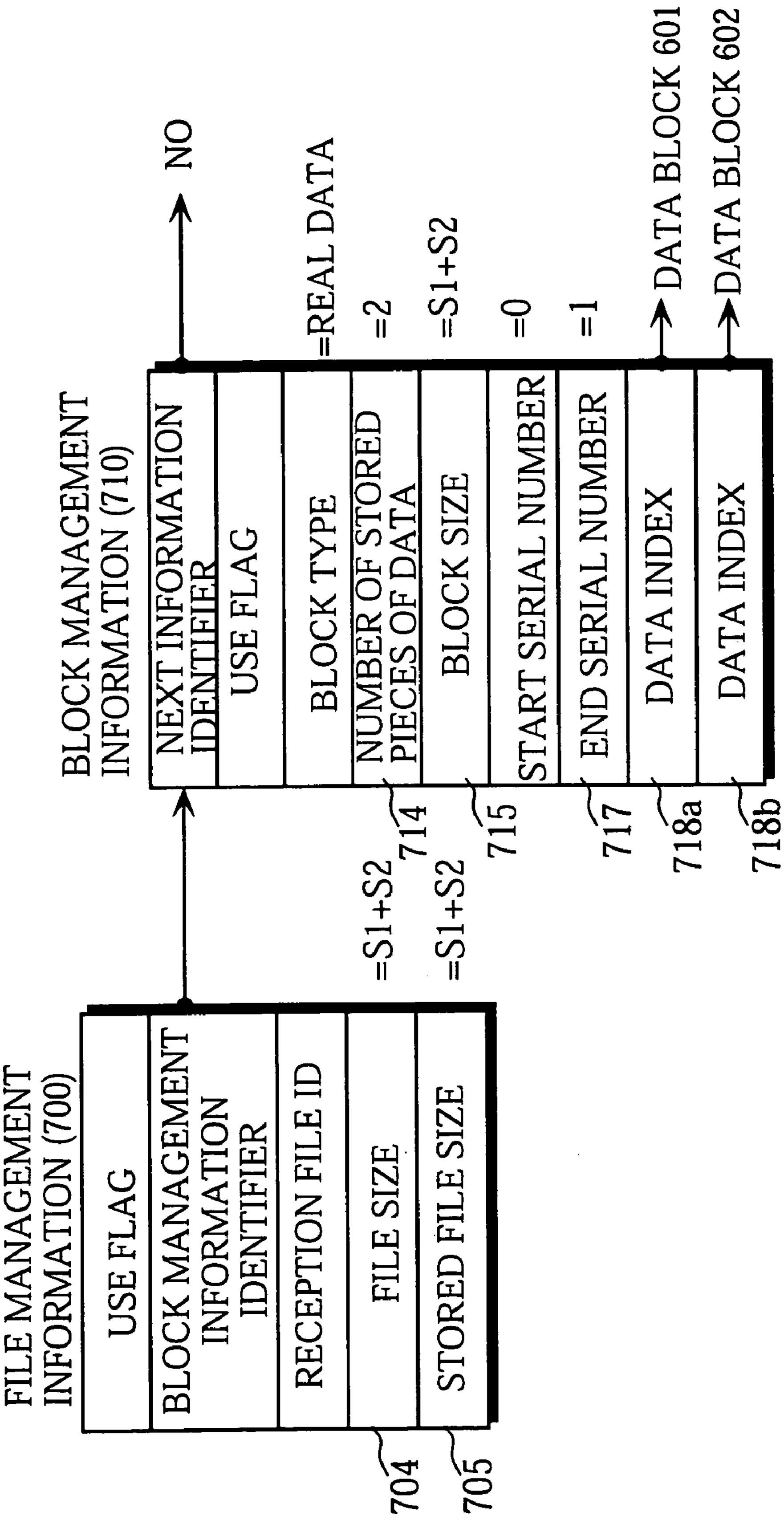
FIG. 8 shows the file management information and the block management information of the lowest layer which are generated and updated when data is received in the order shown in FIG. 6.

FIG. 8 shows each piece of management information generated in the above conditions.

The block management information is updated as follows. First, the position where the index information indicating the received data block 602 excluding the protocol information is to be registered is determined from the serial number. In this example, the file management information 700 including the reception file ID 703 that matches the obtained file identification number "0" is detected. The block management information 710 (FIG. 7) is then detected by referring to the block management information identifier 702 of this file management information 700 (FIG. 7). The start serial number 716 and the end serial number 717 of the block management information 710 are "0". The serial number of the received data block 602 is "1". It is found from these numbers that the index information indicating the received data block 602 excluding the protocol information is positioned next to the block management information 710. Since the block management information 710 does not include the next information identifier 711, it is found that it is addition, not update. It is then found that the position for the addition is the block management information 710 from the fact that the block type 713 of the block management information 710 is "real data" and it is the registration of a normally received block. Therefore, the number of stored pieces of data 714 is incremented from "1" to "2", the block size is increased by "S2" to "S1+S2", and the end serial number 717 is updated from "0" to "1". The index information indicating the data block 602 excluding the protocol information is added to the second data index 718*b*. The file size 704 and the stored file size 705 in the file management information 700 are increased by "S2" to "S1+S2" (FIG. 7 is updated to FIG. 8).

(3) Thirdly, when the data block 603 is received with an error, the block management information is registered and data of the data block 603 is not stored.

Figure 9:
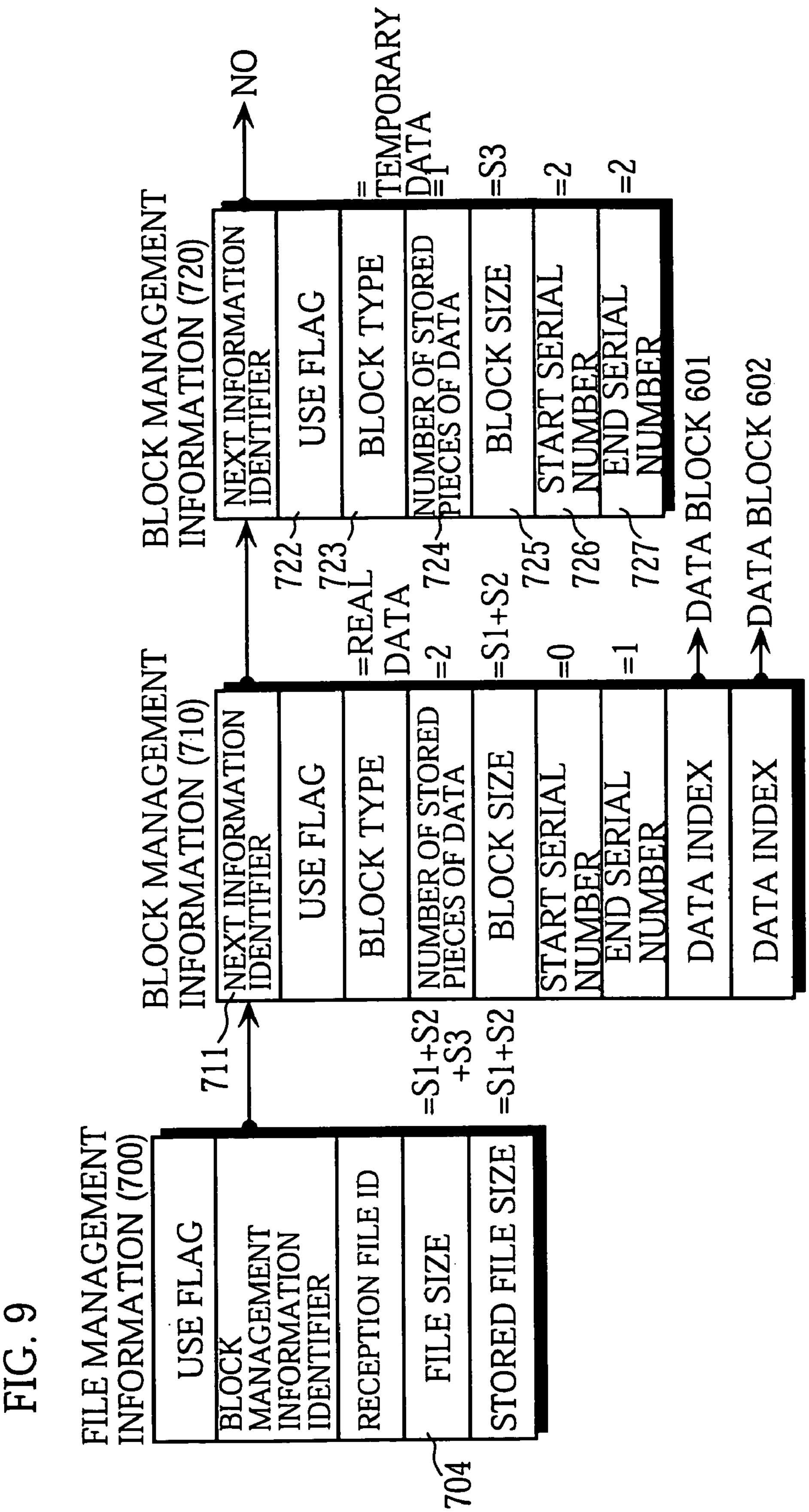
FIG. 9 shows the file management information and the block management information of the lowest layer which are generated and updated when data is received in the order shown in FIG. 6.

FIG. 9 shows each piece of management information generated in the above conditions.

The block management information is updated as follows. First, as with the case of the registration of a normally received data block, the position where the index information indicating the data block 602 excluding the protocol information were to be registered if the data block 603 had been received normally is determined from the serial number. In this example, the file management information 700 including the reception file ID 703 that matches the obtained file identification number "0" is detected. The block management information 710 (FIG. 8) is then detected by referring to the block management information identifier 702 of this file management information 700 (FIG. 8). The start serial number 716 of the block management information 710 is "0". The end serial number 717 is "1". The serial number of the received data block 603 is "2". It is found from these numbers that the index information indicating the received data block 603 excluding the protocol information is positioned next to the block management information 710. Since the block management information 710 does not include the next information identifier 711, it is found that it is addition, not update. It is then found that the position for the addition is the block management information 710 from the fact that the block type 713 of the block management information 710 is "real data". Therefore, an unused area for one piece of the block management information 710 is secured (FIG. 9), the use flag 722 is set to "used", the block type 723 is set to "temporary data", the number of stored pieces of data 714 to "1", the block size 725 is set to "S3", and the start serial number 726 and the end serial number 727 are set to "2" (FIG. 9). The next information identifier 711 of the block management information 710 is set to the identifier of this block management information 720. The file size 704 of the file management information 700 is increased by "S3" to "S1+S2+S3" from "S1+S2" (FIG. 8 is updated to FIG. 9).

(4) Fourthly, when the data block 604 is received normally without an error, the block management information is registered and data of the data block 604 is stored.

Figure 10:
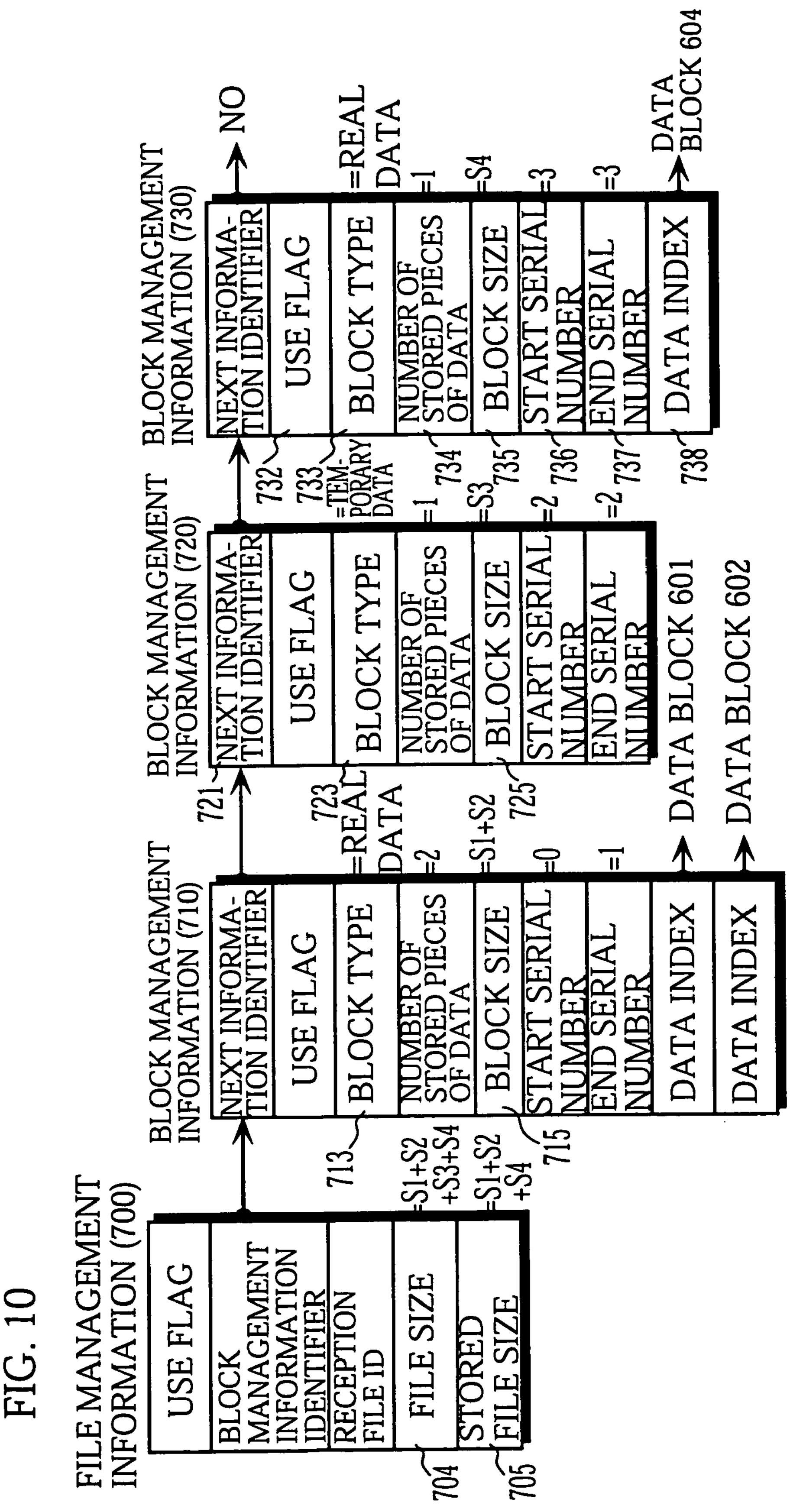
FIG. 10 shows the file management information and the block management information of the lowest layer which are generated and updated when data is received in the order shown in FIG. 6.

FIG. 10 shows each piece of management information generated in the above conditions.

The block management information is updated as follows. First, the position where the index information indicating the received data block 604 excluding the protocol information is to be registered is determined from the serial number. In this example, the file management information 700 including the reception file ID 703 that matches the obtained file identification number "0" is detected. The block management information 710 (FIG. 9) is then detected by referring to the block management information identifier 702 of this file management information 700 (FIG. 9). The start serial number 716 of the block management information 710 is "0". The end serial number 717 is "1". The serial number of the received data block 602 is "1". It is found from these numbers that the index information indicating the received data block 602 excluding the protocol information is positioned next to the block management information 710. The next information identifier 711 of the block management information 710 is referred to to detect the block management information 720 (FIG. 9). The start serial number 726 and the end serial number 727 of the block management information 720 are "2". The serial number of the received data block 604 is "3". It is found from these numbers that the index information indicating the received data block 604 excluding the protocol information is positioned next to the block management information 720. Since the block management information 720 does not include the next information identifier 721, it is found that it is addition, not update. It is then found that the position for the addition is a new piece of block management information other than the block management information 720 from the fact that the block type 723 of the block management information 720 is "temporary data" and it is normally received data. Therefore, an unused area for one piece of the block management information 730 is secured (FIG. 10), the use flag 732 is set to "used", the block type 733 is set to "real data", the number of stored pieces of data 734 to set to "1", the block size 715 is set to "S4", and the start serial number 736 and the end serial number 737 are set to "3", and the first data index 738 is set to the index information indicating the received data block 604 excluding the protocol information (FIG. 10). The next information identifier 721 of the block management information 720 is set to the identifier of this block management information 730. The file size 704 of the file management information 700 is increased by "S4" to "S1+S2+S3+S4" from "S1+S2+S3", and the stored file size 705 of the file management information 700 is increased by "S4" to "S1+S2+S4" from "S1+S2" (FIG. 9 is updated to FIG. 10).

Up to this point, the data blocks A to D have been received, though they include abnormal data.

(5) Fifthly, the data block 605 is received normally. The management information, however, is not updated since the data block 601 having the same contents as the data block 605 has been received normally.

Whether a data block having the same contents has been received normally is judged by checking whether index information indicating a data block excluding the protocol information having the same serial number as the received block has been registered.

In this example, the file management information 700 including the reception file ID 703 that matches the obtained file identification number "0" is detected. The block management information 710 (FIG. 10) is then detected by referring to the block management information identifier 702 of this file management information 700 (FIG. 10). The start serial number 716 of the block management information 710 is "0". The end serial number 717 is "1". The serial number of the received data block 605 (FIG. 6) is "0". It is found from these numbers that the index information indicating the received data block 605 excluding the protocol information is positioned at the block management information 710. Since the block type 713 of the block management information 710 is "real data", it is recognized that the index information indicating a data block excluding the protocol information having the same contents as the data block 605 is included in the block management information 710. As a result, the received data block 605 is discarded, and the management information is not updated.

(6) Sixthly, the data block 606 is received normally. The management information, however, is not updated since the data block 602 having the same contents as the data block 605 has been received normally.

The process is not detailed here since it is the same as (5) above.

(7) Seventhly, the data block 607 is received normally. The management information is updated and the data of the data block 607 is stored.

Figure 11:
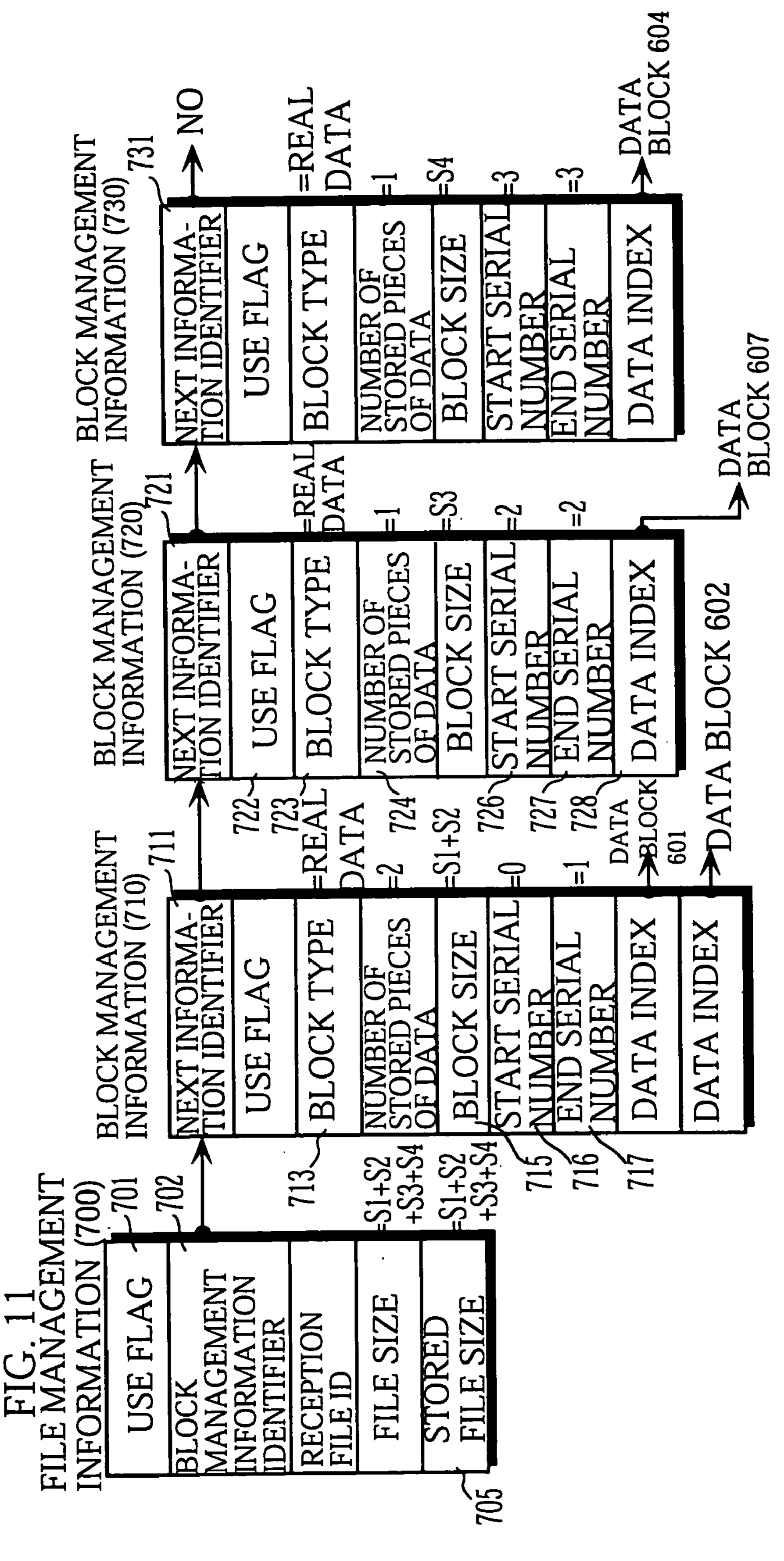
FIG. 11 shows the file management information and the block management information of the lowest layer which are generated and updated when data is received in the order shown in FIG. 6.

FIG. 11 shows the management information generated in the above conditions.

The block management information is updated as follows. First, the position where the index information indicating the received data block 607 excluding the protocol information is to be registered is determined from the serial number. In this example, the file management information 700 including the reception file ID 703 that matches the obtained file identification number "0" is detected. The block management information 710 (FIG. 10) is then detected by referring to the block management information identifier 702 of this file management information 700 (FIG. 10). The start serial number 716 of the block management information 710 is "0". The end serial number 717 is "1". The serial number of the received data block 607 is "2". It is found from these numbers that the index information indicating the received data block 607 excluding the protocol information is positioned next to the block management information 710. The next information identifier 711 of the block management information 710 is referred to to detect the block management information 720 (FIG. 10). The start serial number 726 and the end serial number 727 of the block management information 720 are "2". The serial number of the received data block 607 is "2". It is found from these numbers that the index information indicating the received data block 607 excluding the protocol information is positioned at the block management information 720. It is then found that the position for the update is the block management information

720 from the fact that the block type 723 of the block management information 720 is "temporary data" and it is the update of normally received block. Therefore, the block type 723 of the block management information 720 is updated from "temporary data" to "real data". The first data index 728 is set to the index information indicating the received data block 607 excluding the protocol information. The stored file size 705 of the file management information 700 is increased by "S3" to "S1+S2+S3+S4" from "S1+S2+S4" (FIG. 10 is updated to FIG. 11).

(8) Since the block type 723 of the block management information 720 is updated to "real data", the present block management information is combined with the previous pieces of block management information.

Figure 12:
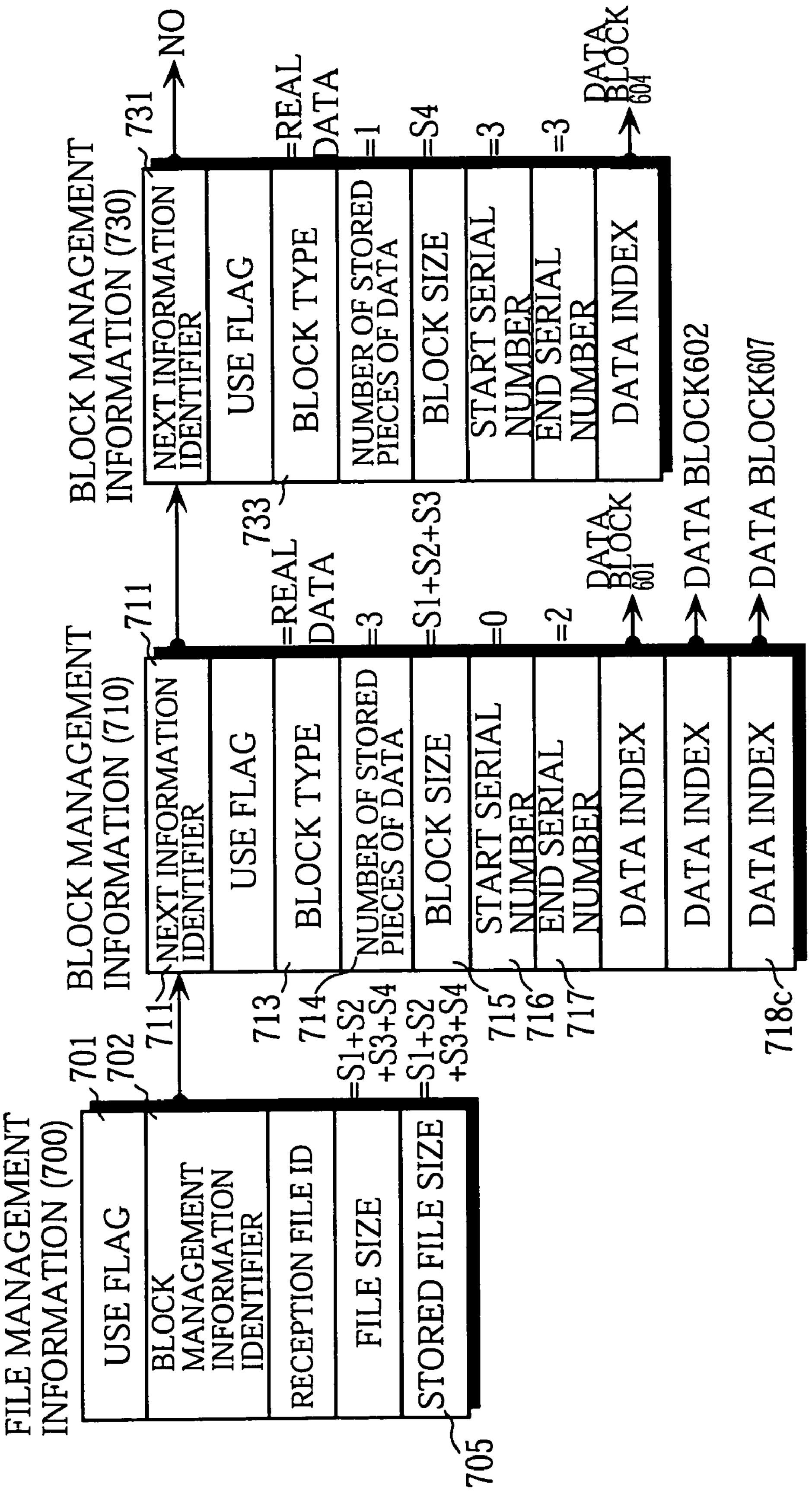
FIG. 12 shows the file management information and the block management information of the lowest layer which are generated and updated when data is received in the order shown in FIG. 6.

FIG. 12 shows the management information in the above conditions.

In this combination, first, it is judged whether the block management information 720 whose block type 723 has been updated can be combined with the preceding block management information 710. In this example, it is judged that the block management information 720 and 710 can be combined since the block type 713 of the block management information 710 (FIG. 11) and the block type 723 of the block management information 720 (FIG. 11) are both "real data" and since the end serial number 717 of the block management information 710 is "1" and the start serial number 726 of the block management information 720 is "2", indicating they are successive. As a result, the number of stored pieces of data 714 of the block management information 710 is updated from "2" to "31" by adding "1" in the number of stored pieces of data 724 of the block management information 720. The block size 715 of the block management information 710 is updated from "S1+S2" to "S1+S2+S3" by adding "S3" in the block size 725 of the block management information 720. The end serial number 717 of the block management information 710 is replaced by the end serial number 727 of the block management information 720, "2". The data index 718*c* is generated by adding information of the data index 728 of the block management information 720 to the data index 718*b* of the block management information 710 (FIG. 11 is updated to FIG. 12).

(9) The block management information is further combined with the subsequent pieces of block management information.

Figure 13:
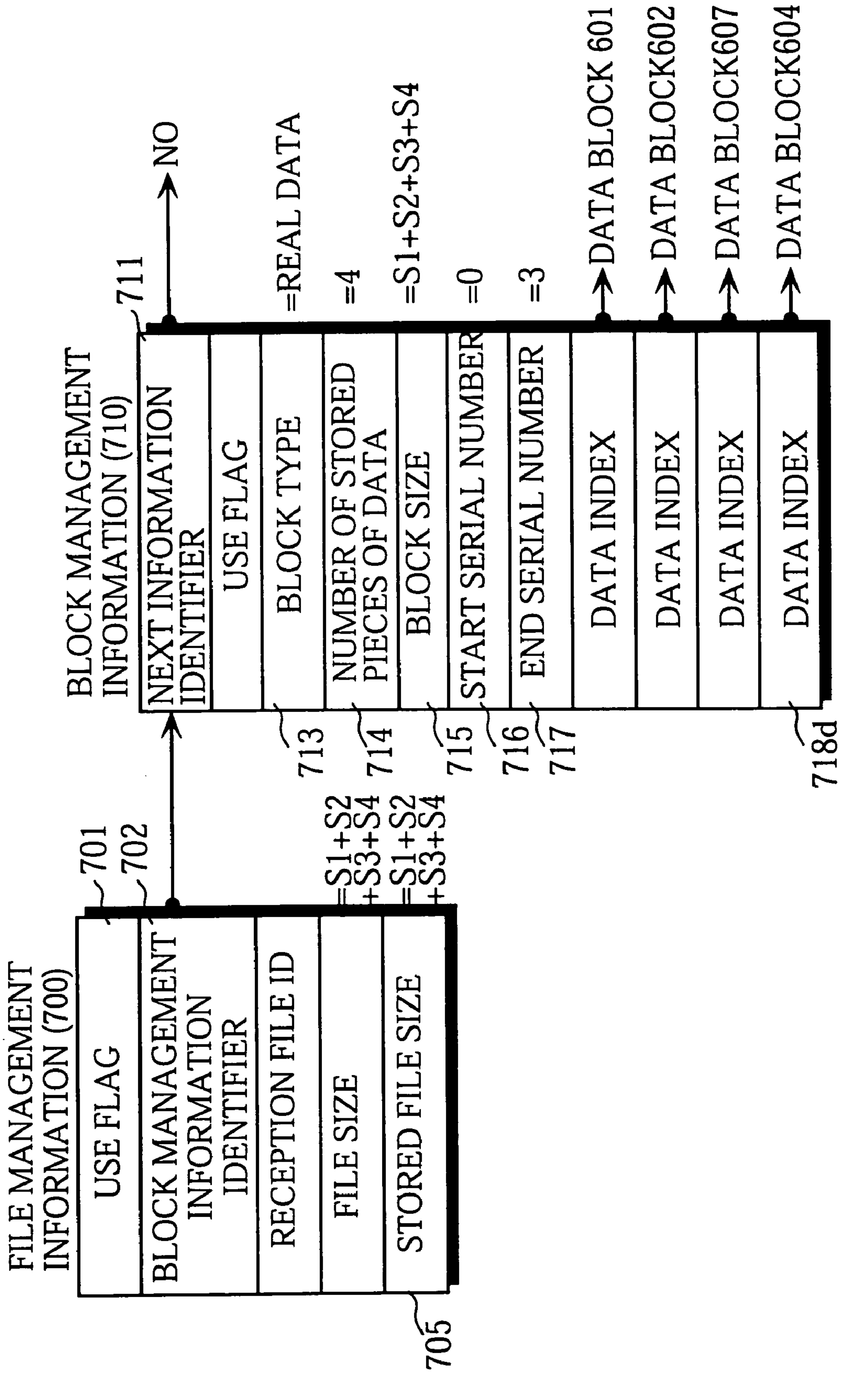
FIG. 13 shows the file management information and the block management information of the lowest layer which are generated and updated when data is received in the order shown in FIG. 6.

FIG. 13 shows the management information in the above conditions.

In this combination, first, it is judged whether the block management information 720 whose block type 723 has been updated can be combined with the next block management information 730. However, as described in (8) above, the block management information 720 has been combined with the block management information 710. Therefore, it is judged whether the block management information 710 can be combined with the block management information 730. In this example, it is judged that the block management information 730 and 710 can be combined since the block type 713 of the block management information 710 (FIG. 12) and the block type 723 of the block management information 730 (FIG. 12) are both "real data" and since the end serial number 717 of the block management information 710 is "2" and the start serial number 736 of the block management information 730 is "3", indicating they are successive. As a result, the number of stored pieces of data 714 of the block management information 710 is updated from "3" to "4" by adding "1" in the number of stored pieces of data 734 of the block management information 730. The block size 715 of the block management information 710 is updated from "S1+S2+S3" to "S1+S2+S3+S4" by adding "S4" in the block size 735 of the block management information 730. The end serial number 717 of the block management information 710 is replaced by the end serial number 737 of the block management information 730, "3". The data index 718*d* is generated by adding information of the data index 738 of the block management information 730 to the data index 718*c* of the block management information 710 (FIG. 12 is updated to FIG. 13).

Up to this point, the data blocks A to D have been received completely.

(10) The data block 608 is received normally. The management information, however, is not updated since the data block 604 having the same contents as the data block 608 has been received normally.

The process is not detailed here since it is the same as (5) above.

As described above, when a reception error occurs while data blocks with the protocol information are sequentially transmitted, only the data block to which the reception error has occurred is received again. This arrangement reduces the time taken for receiving file.

In this embodiment, a plurality of pieces of block management information whose block type indicates "real data" are combined together. Though it is possible to combine a plurality of pieces of block management information whose block type indicates "temporary data", it is not necessary.

Reconstruction and Decoding of Higher Layers

The following is a description of the reconstruction and decoding of higher layers supposing that all the data blocks of the lower layer necessary for reconstructing the higher layers have been received.

Figure 14:
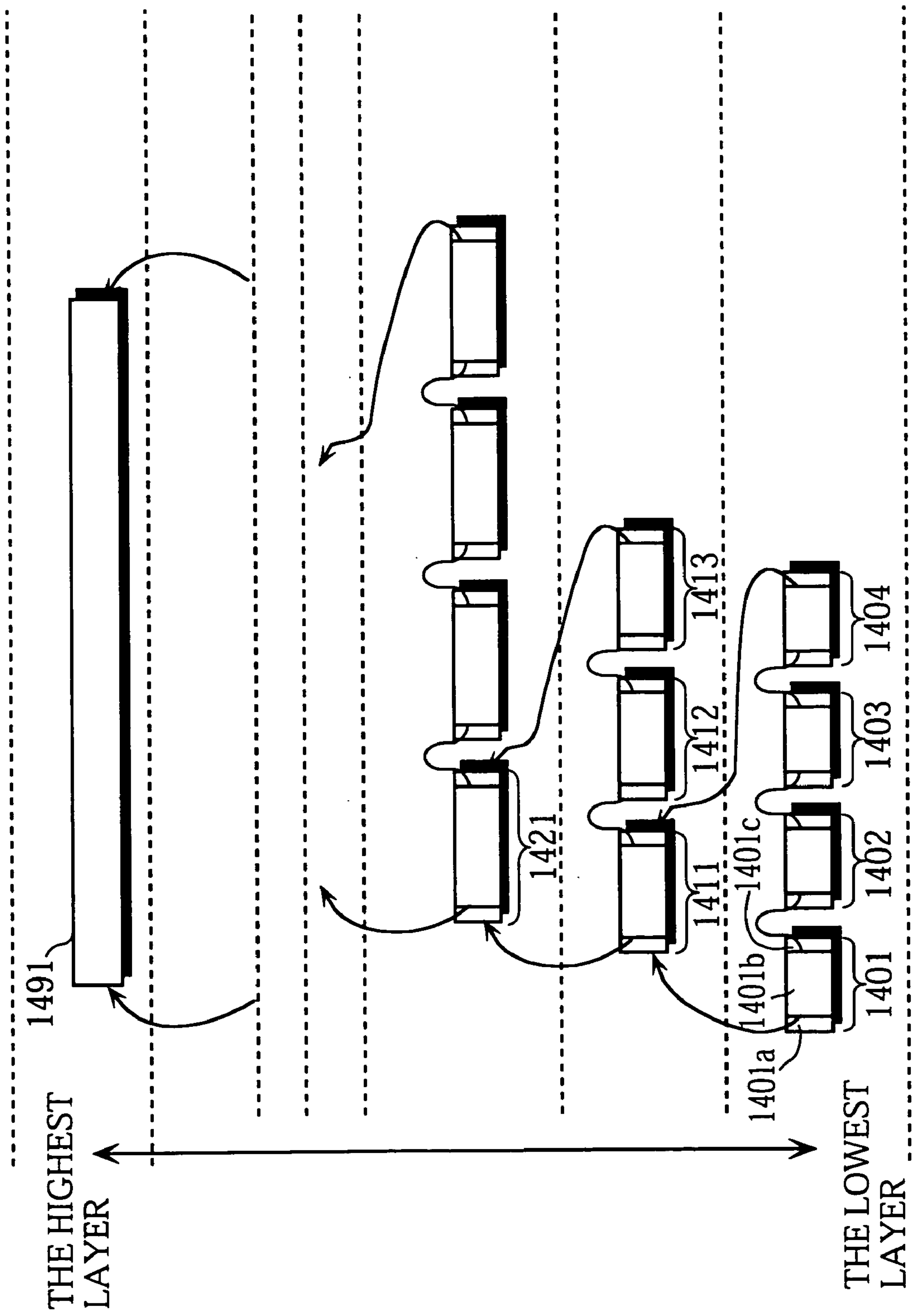
FIG. 14 shows a transfer of the broadcast data from the lower layer to the higher layer.

FIG. 14 shows a transfer of the broadcast data from the lower layer to the higher layer.

The data block 1401 shown in FIG. 14 includes a protocol header 1401*a*, a protocol-included data 1401*b*, and a protocol footer 1401*c*. This applies to the other data blocks 14XX.

The data blocks 1401 to 1404 belong to the lowest layer. The data block 1411 in layer 2 is reconstructed and decoded from the data blocks 1401 to 1404 in the lowest layer by linking the protocol-included data 1401*b*, 1402*b*, 1403*b*, and 1404*b* by detecting the positions of them in the data block 1411 in layer 2 by referring to the protocol information in the protocol header 140Xa and the protocol footer 140Xc of each data block based on the protocol of the lowest layer. The data blocks 1412 to 1413 are reconstructed and decoded in the same way. Similarly, the data block 1421 in layer 3 is reconstructed and decoded from the data blocks 1411 to 1414 in layer 2. Such reconstruction and decoding based on the protocol of each layer are repeated up to the highest layer and the data block 1491 in the highest layer is reconstructed and decoded.

Figure 15:
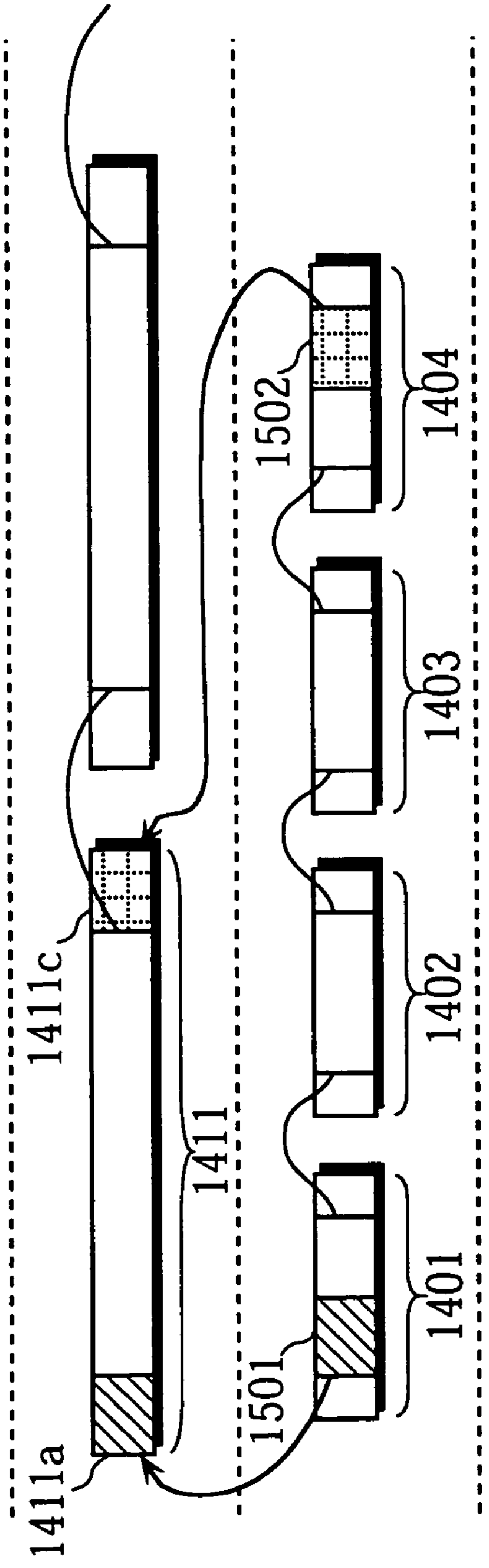
FIG. 15 shows the reconstruction and decoding of data blocks in layer 2.

FIG. 15 shows the reconstruction and decoding of data blocks in layer 2. The components in FIG. 15 having the same reference numbers as FIG. 14 are the same as those in FIG. 14.

As shown in FIG. 15, the protocol header 1411*a* of the data block 1411 in layer 2 is the start portion of the protocol-included data 1401*b* of the data block 1401 in layer 1 (1501 in FIG. 15), and the protocol footer 1411*c* of the data block 1411 in layer 2 is the end portion of the protocol-included data 1401*b* of the data block 1404 in layer 1.

After the data block 1411 in layer 2 is reproduced, the protocol header 1401*a* and the protocol footer 1401*c* of the data block 1401 in layer 1 become unnecessary. Similarly, after the data block 1421 in layer 3 is reproduced, the protocol header 1411*a* and the protocol footer 1411*c* of the data block 1411 in layer 2 become unnecessary. Such relationships apply to any pair of a higher layer and a lower layer.

The block management information for managing the above will be defined as follows.

Figure 16:
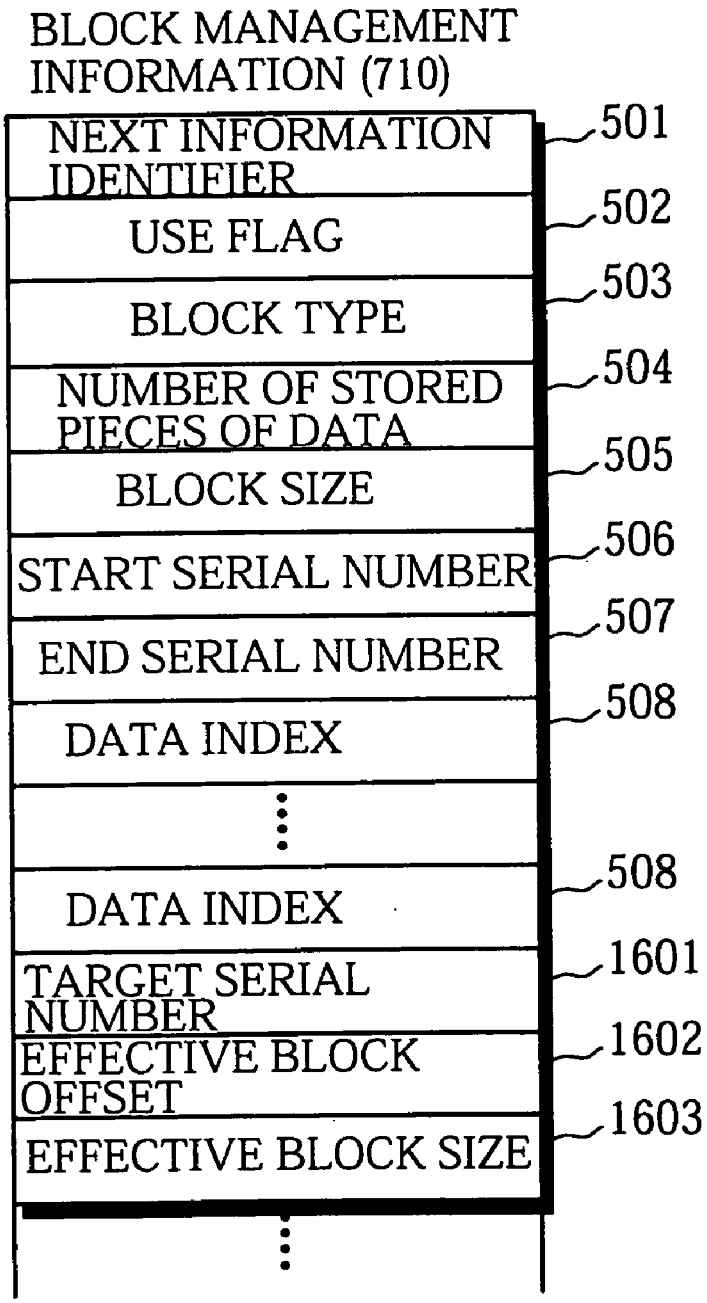
FIG. 16 shows the block management information for managing data blocks in layer 2.

FIG. 16 shows the block management information for managing data blocks in layer 2.

The block management information shown in FIG. 16 includes, as well as the contents of the block management information shown in FIG. 5, a target serial number 1601 indicating a serial number of a target data block and being used for identifying the target data block, an effective block offset 1602 indicating a size of data put before effective data, and an effective block size 1603 indicating a size of the effective data. Note that the target serial number 1601, effective block offset 1602, and effective block size 1603 are equivalent to the first offset information to the $N^{th}$ offset information, and are generated by the layer-1 protocol decoder 121 to the layer-N protocol decoder 12N.

Figure 17A:
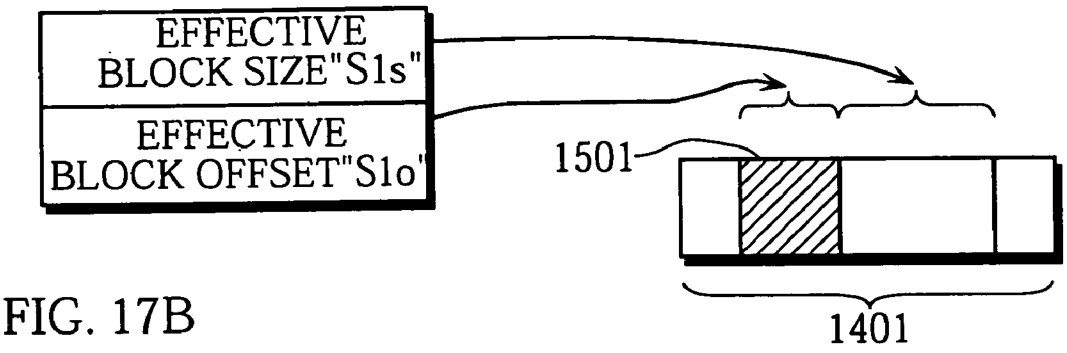
FIG. 17A shows a positional relationship between the effective block offset and the effective block size in data block 1401 in layer 1.
Figure 17B:
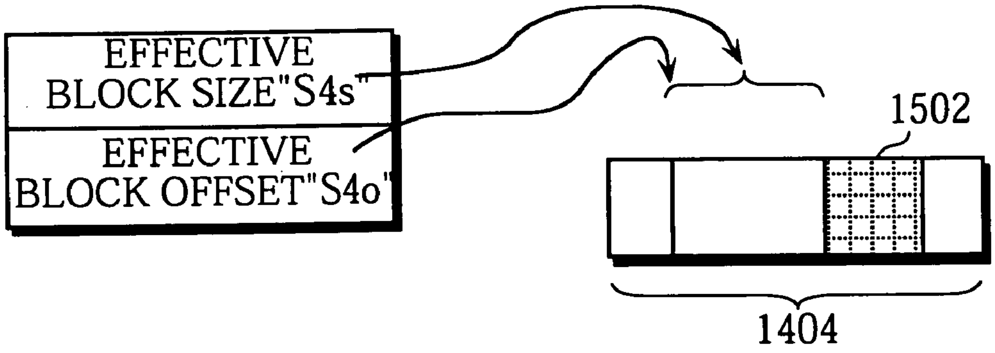
FIG. 17B shows a positional relationship between the effective block offset and the effective block size in data block 1404 in layer 1.

FIG. 17A shows a positional relationship between the effective block offset and the effective block size in data block 1401 in layer 1. FIG. 17B shows a positional relationship between the effective block offset and the effective block size in data block 1404 in layer 1.

In FIGS. 17A and 17B, the effective block offset and the effective block size of the data block 1401 are represented as "S1*o*" and "S1*s*", respectively, and the effective block offset and the effective block size of the data block 1404 are represented as "S4*o*" and "S4*s*", respectively.

Figure 18:
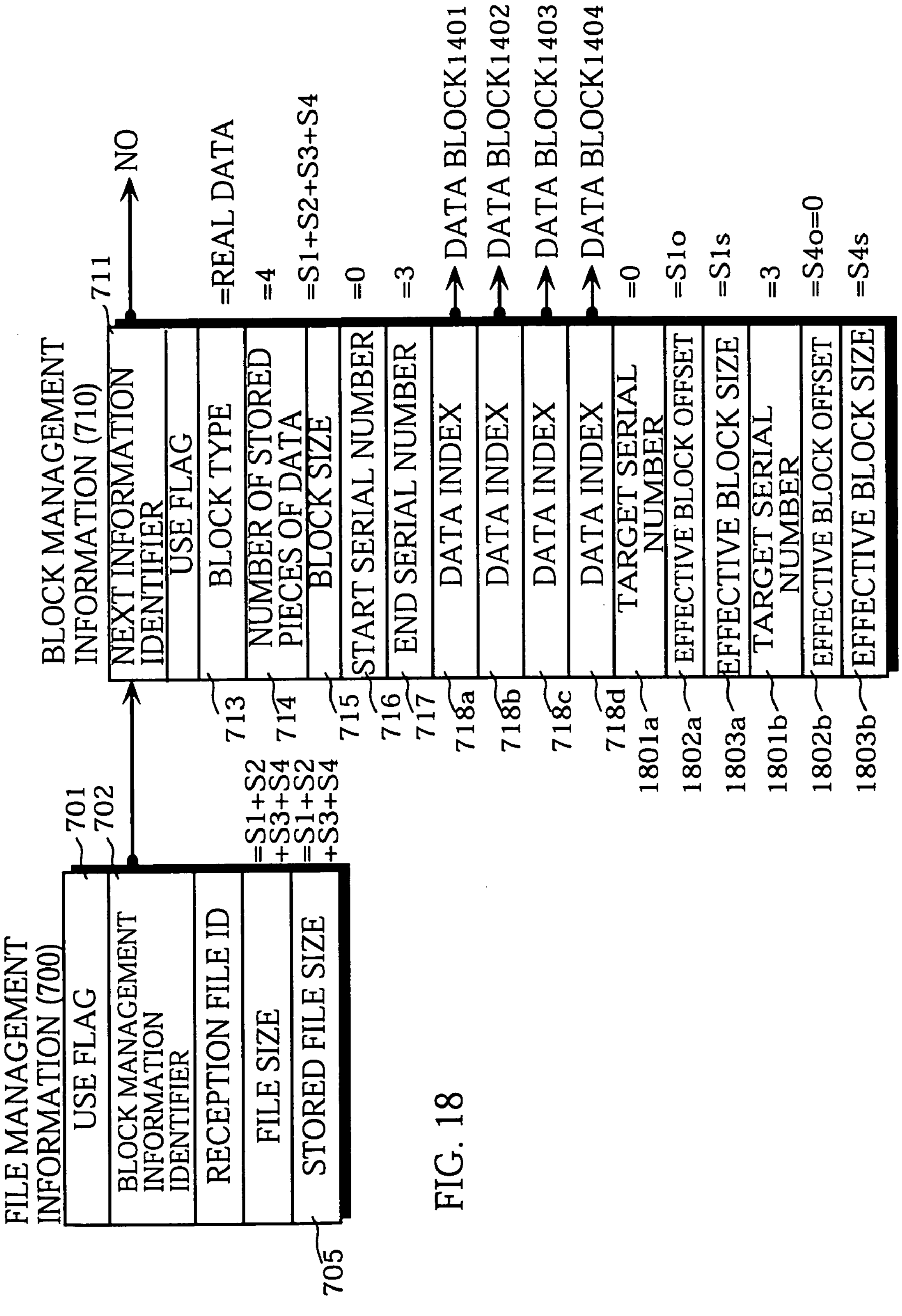
FIG. 18 shows that the management information shown in FIG. 13 is arranged to further include the target serial number, effective block offset, and effective block size shown in FIG. 16 to manage the data block 1411 in layer 2.

FIG. 18 shows that the management information shown in FIG. 13 is arranged to further include the target serial number, effective block offset, and effective block size shown in FIG. 16 to manage the data block 1411 in layer 2. In FIG. 18, the data size of the portion excluding the protocol information of the data blocks 1401 to 1403 is represented as "S1" to "S4", respectively.

The two target data blocks are registered with the block management information 710. As a result, as shown in FIG. 18, the target serial number 1801*a* is set to "0" being the serial number of the data block 1401, the effective block offset 1802*a* is set to "S1*o*" being the effective block offset of the data block 1401, the effective block size 1803*a* is set to "S1*s*" being the effective block size of the data block 1401, the target serial number 1801*b* is set to "3" being the serial number of the data block 1404, the effective block offset 1802*b* is set to "S4*o*" being the effective block offset of the data block 1404, and the effective block size 1803*b* is set to "S4*s*" being the effective block size of the data block 1404.

Data blocks in layer 3 and higher layers are then reconstructed and decoded.

In this way, up to data blocks in the highest layer are reconstructed and decoded.

As described above, in reconstruction and decoding of the data blocks in a higher layer, data is not copied, but information specifying each data section constituting the higher layer is added. With this arrangement, the data blocks in layer 1 are first stored and used as portions of the data blocks in the higher layers. This provides an effective file management.

Now, reconstruction and decoding of the data blocks in a higher layer when all the data blocks in a lower layer necessary for reconstructing data blocks in the higher layer have not been received normally due to a reception error.

In this example, reconstruction of a higher layer is started immediately after the data blocks 1401 to 1404 are received normally except the data block 1403 which is received with an error.

Figure 19:
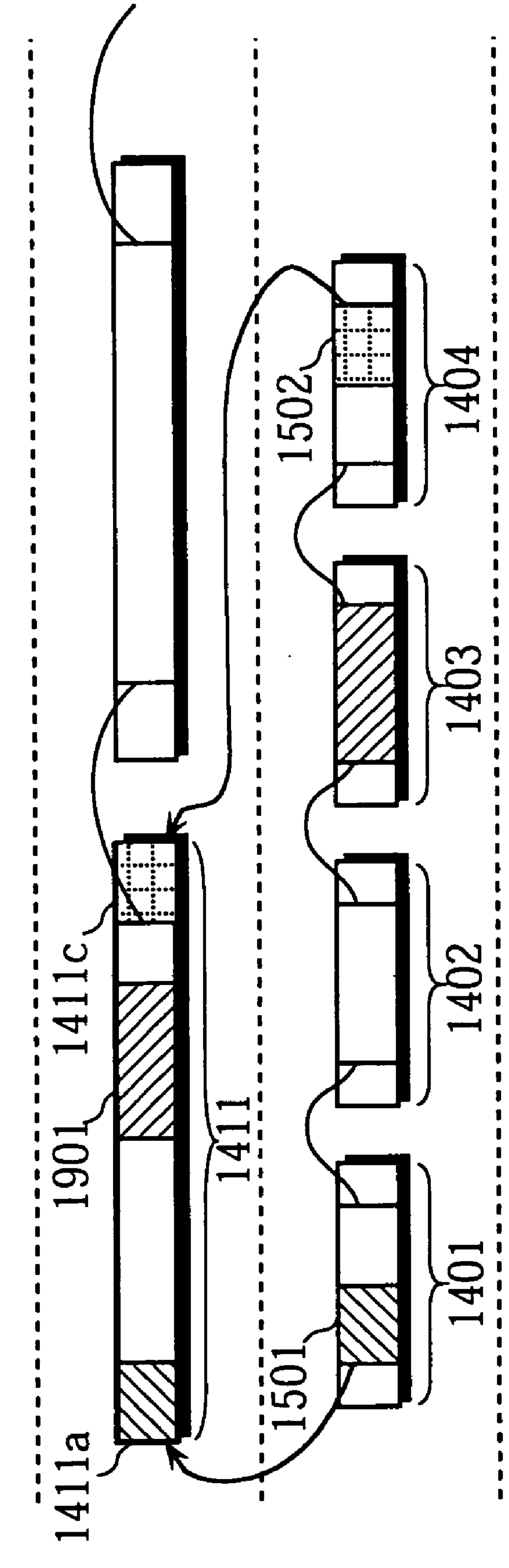
FIG. 19 shows detailed reconstruction and decoding of data blocks in layer 2.

FIG. 19 shows detailed reconstruction and decoding of data blocks in layer 2. The components in FIG. 19 having the same reference numbers as FIG. 15 are the same as those in FIG. 15.

FIG. 19 differs from FIG. 15 in that data portion of the data block 1403 has not been stored in the data storage unit 140 due to a reception error having occurred to the protocol-included data 1403*b* in the data block 1403.

As shown in FIG. 19, that the protocol-included data 1403*b* has not been stored means that the corresponding data 1901 in the data block 1411 in layer 2 has not been stored at this point in time. However, since the data 1901 does not include data in the protocol header 1411*a* and the protocol footer 1411*c*, reconstruction and decoding of the data blocks in layer 3 are executed without trouble.

Figure 20:
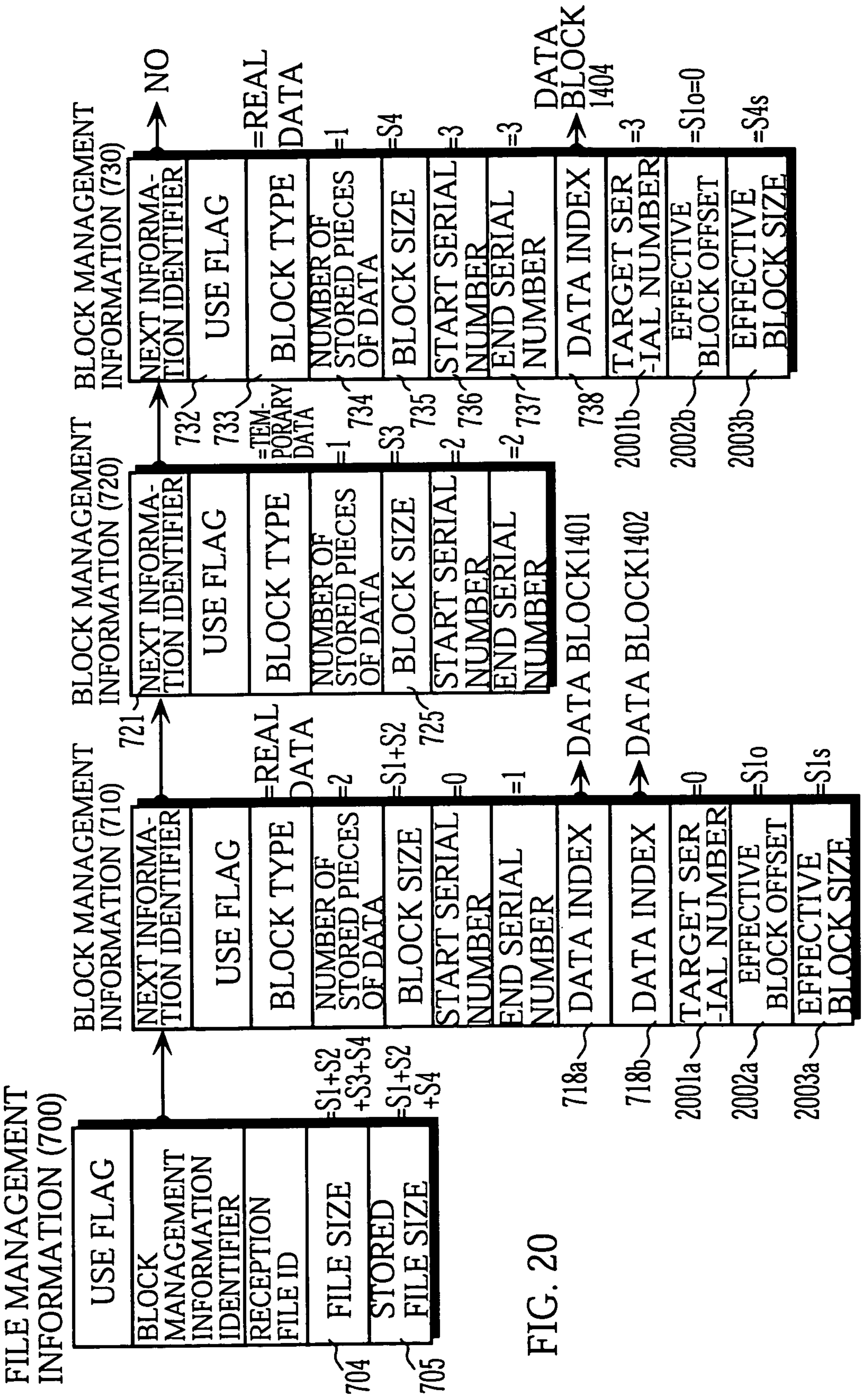
FIG. 20 shows that the management information shown in FIG. 10 is arranged to further include the target serial number, effective block offset, and effective block size shown in FIG. 16 to manage the data block 1411 in layer 2.

FIG. 20 shows that the management information shown in FIG. 10 is arranged to further include the target serial number, effective block offset, and effective block size shown in FIG. 16 to manage the data block 1411 in layer 2. In FIG. 20, the data size of the portion excluding the protocol information of the data blocks 1401 to 1403 is represented as "S1" to "S4", respectively.

As shown in FIG. 20, since the target data block 1401 is registered with the block management information 710, the target serial number 2001*a* is set to "0" being the serial number of the data block 1401, the effective block offset 2002*a* is set to "S1*o*"-being the effective block offset of the data block 1401, the effective block size 2003*a* is set to "S1*s*" being the effective block size of the data block 1401. Since the target data block 1404 is registered with the block management information 730, the target serial number 2001*b* is set to "3" being the serial number of the data block 1404, the effective block offset 2002*b* is set to "S4*o*" being the effective block offset of the data block 1404, and the effective block size 2003*b* is set to "S4*s*" being the effective block size of the data block 1404.

Reconstruction and decoding of data blocks in higher layers are executed, as is the case with data blocks in layer 3, as far as the portion to which a reception error has occurred does not include data in the protocol header or the protocol footer in any layer.

As understood from above, even if a reception error occurs to the data in a data block, data blocks in up to the highest layer are reconstructed and decoded as far as the data portion to which the reception error has occurred is not the protocol information in any layer.

As described above, in reconstruction and decoding of the data blocks in a higher layer, even if data is not received normally, information specifying each data section constituting the higher layer is added, and the data blocks in the lowest layer can be used as parts of the data blocks in the higher layer. With this arrangement, reconstruction and decoding of the data blocks in the higher layer are executed before all the data blocks constituting the higher layer are received normally. As a result, it is possible to use data including a defective data block. Later, when the defective part is received normally, the corresponding part in the higher layer can be updated. This provides an effective file management.

Reference to Data

The following is a description of a case where a data section is referred to. In this example, it is supposed that layer 3 is the highest layer, and that a part of the data block 1421 in the highest layer corresponding to the data block 1411 is referred to.

The first case to be described is based on the premise that data blocks in the lowest layer constituting the data blocks 1411 to 1413 have all been received normally, that is, all necessary file data has been received.

FIG. 18 shows the management information of the data block 1411 in the above point in time.

In this example, the following are performed based on the protocol of the highest layer. The file management information 700 (FIG. 20) including data requested to be referred to is detected. The block management information 710 (FIG. 20) is then detected by referring to the block management information identifier 702 of the file management information 700. The data part of the data block 1421 corresponding to the data blocks 1401 to 1402 is obtained from the data indexes 718*a* to 718*b*, the target serial number 2001*a* "0", the effective block offset 2002*a* "S1*o*", and the effective block size 2003*a* "S1*s*" in the block management information 710. The block management information 720 (FIG. 20) is then detected by referring to the next information identifier 711 of the block management information 710. The size of the data not having been received is obtained from the block size 725 "S3" in the block management information 720. The block management information 730 (FIG. 20) is detected by referring to the next information identifier 721 of the block management information 720. The data part of the data block 1421 corresponding to the data block 1404 is obtained from the data indexes 738, the target serial number 2001*b* "3", the effective block offset 2002*b* "S4*o*", and the effective block size 2003*b* "S4*s*" in the block management information 730.

Now, how data is used when all file data has not been received due to a reception error of the data block 1403 will be described.

FIG. 21 shows an HTML file sent by a general data broadcast service.

Figure 22:
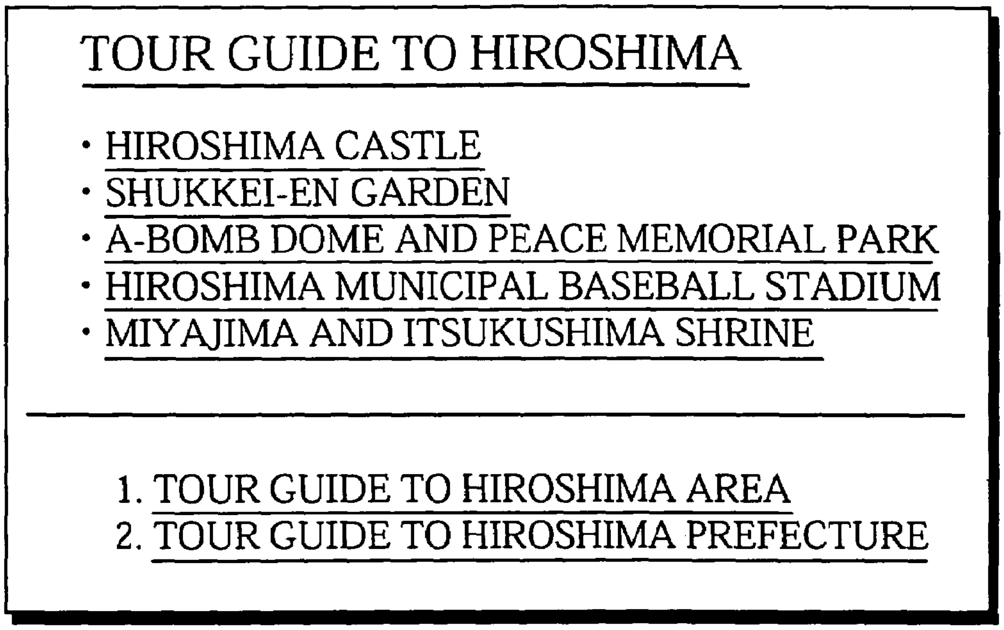
FIG. 22 shows the complete HTML file 2101 shown in FIG. 21 displayed by the broadcast data viewer of the present invention.
Figure 23:
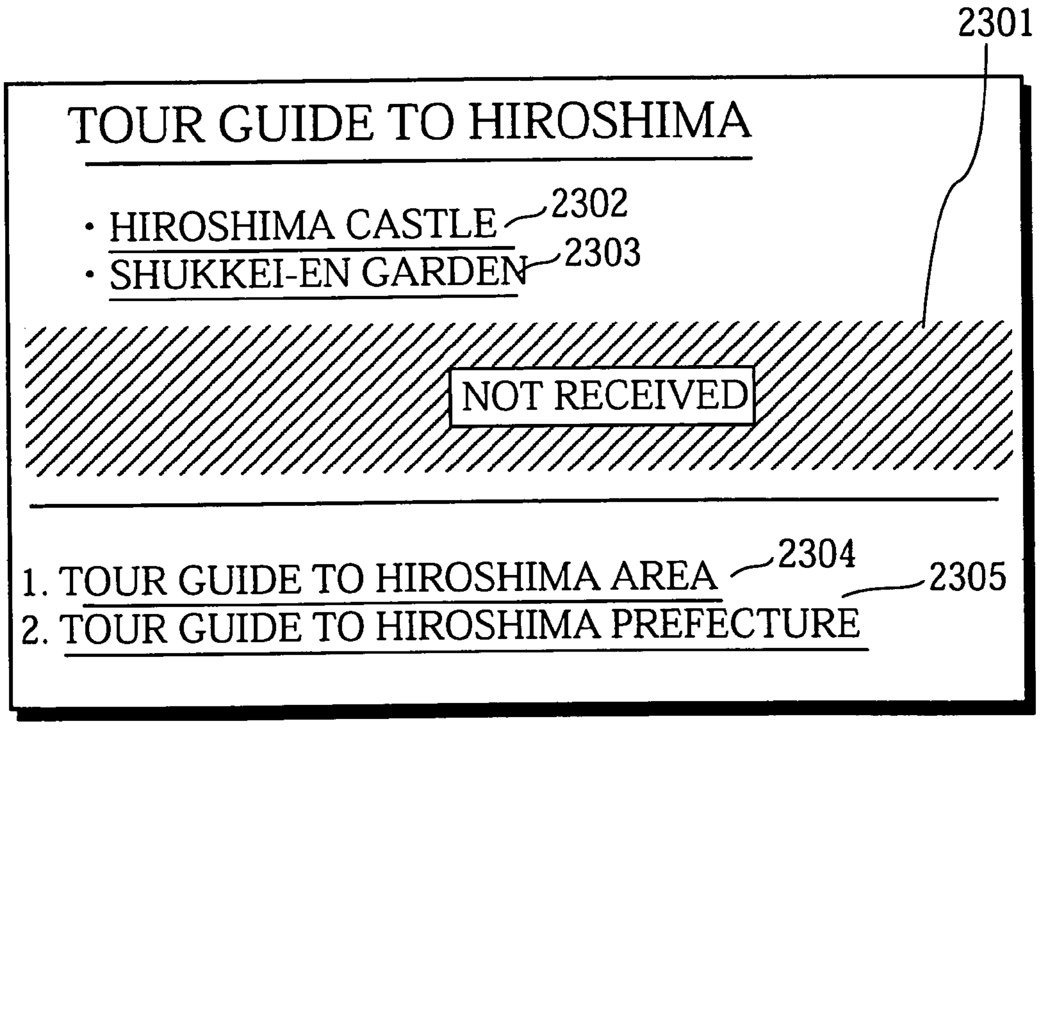
FIG. 23 shows the HTML file shown in FIG. 21 displayed by the broadcast data viewer of the present invention excluding a part 2102 of the HTML file which has not been stored in the data storage unit 140 due to a reception error of the part 2102.

FIG. 22 shows the complete HTML file 2101 shown in FIG. 21 displayed by the broadcast data viewer of the present invention. FIG. 23 shows the HTML file shown in FIG. 21 displayed by the broadcast data viewer of the present invention excluding a part 2102 of the HTML file which has not been stored in the data storage unit 140 due to a reception error of the part 2102.

In accordance with the broadcast data management system in the present embodiment, when the broadcast data viewer of the present invention displays an HTML file not having in part been stored, the position where the not-stored part is to be displayed can be detected from the management information without difficulty. As a result, it is possible to display a blank at the position or to display a comment such as "not received" as shown in the display area 2301 in FIG. 23. The size of the not-stored part is also detected. As a result, it is possible to secure a display area as large as the not-stored part.

The link destinations 2301 to 2304 can be selected earlier than conventional techniques since they are displayed before all the data is received. This enables the received data to be used more effectively than the conventional techniques.

Figure 24:
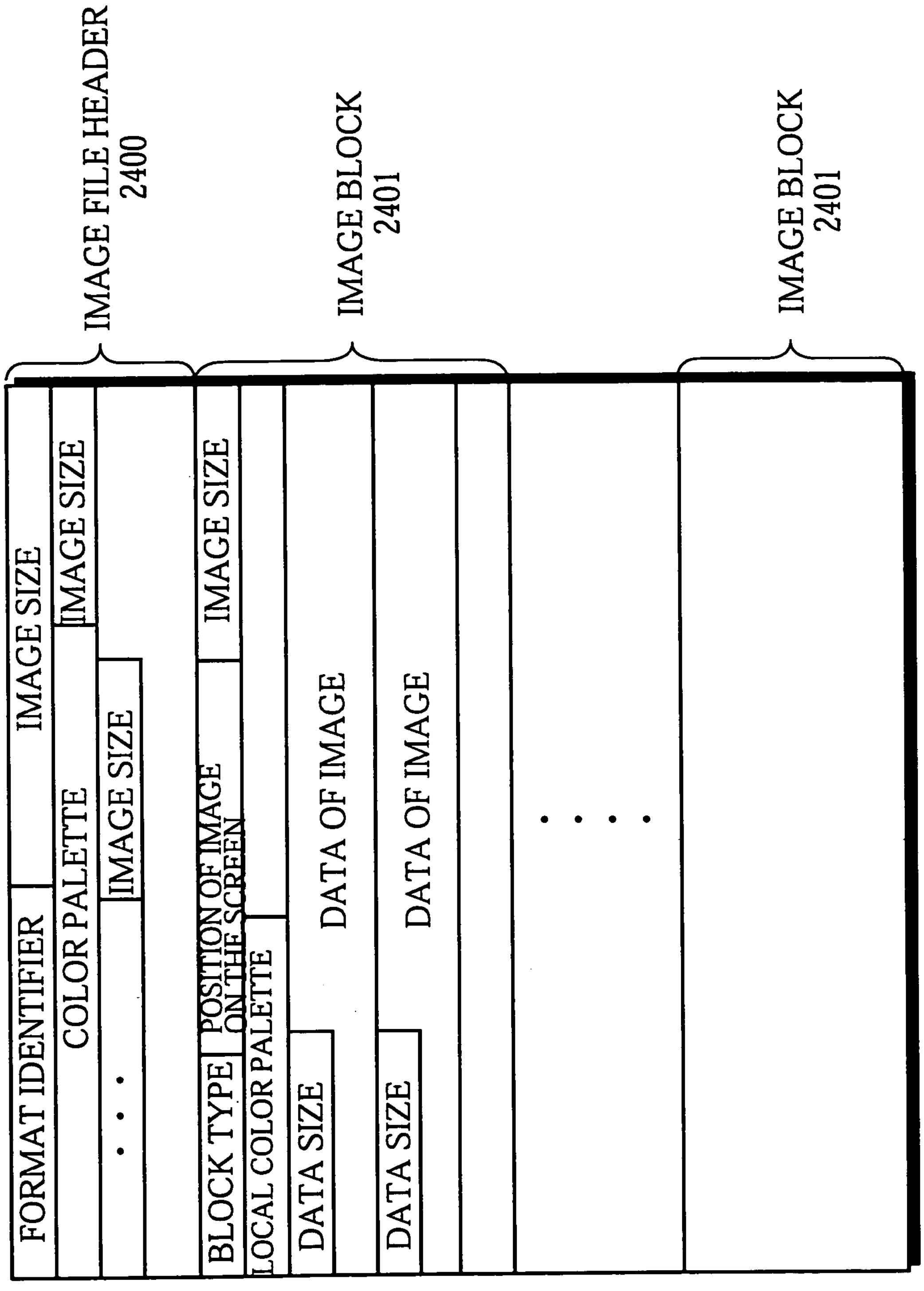
FIG. 24 shows a format of an image file.

FIG. 24 shows a format of an image file.

The image file format shown in FIG. 24 includes an image file header 2400 and a plurality of image blocks 2401.

The image file header 2400 stores information relating to the whole file such as a format identifier, an image size, a color palette, and a size of a plurality of images.

The plurality of image blocks 2401 each store a block type, a position of an image on the screen, an image size, a local color palette, and data of a plurality of images and its size.

A plurality of images may be overlaid, where the background is transparent. A plurality of images with different resolutions may be stored in the order of the resolution, and displayed in the order of reception. A plurality of images may be displayed in succession as an animated picture.

Figure 25:
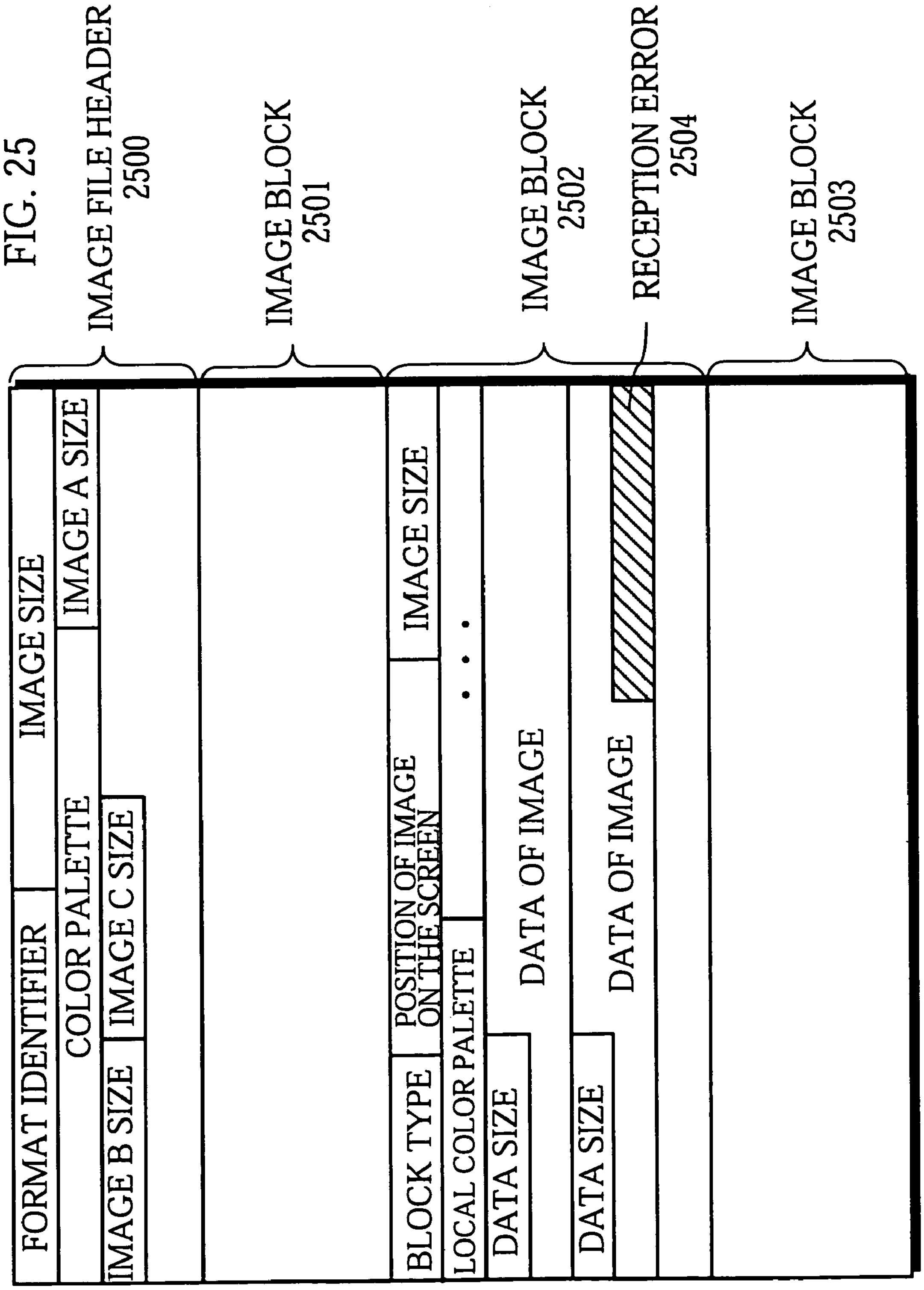
FIG. 25 shows an image file for overlaying a plurality of images with the transparent background.

FIG. 25 shows an image file for overlaying a plurality of images with the transparent background.

The reception error 2504 (with slant lines) in FIG. 25 represents a data part not stored due to a reception error.

Figure 26A:
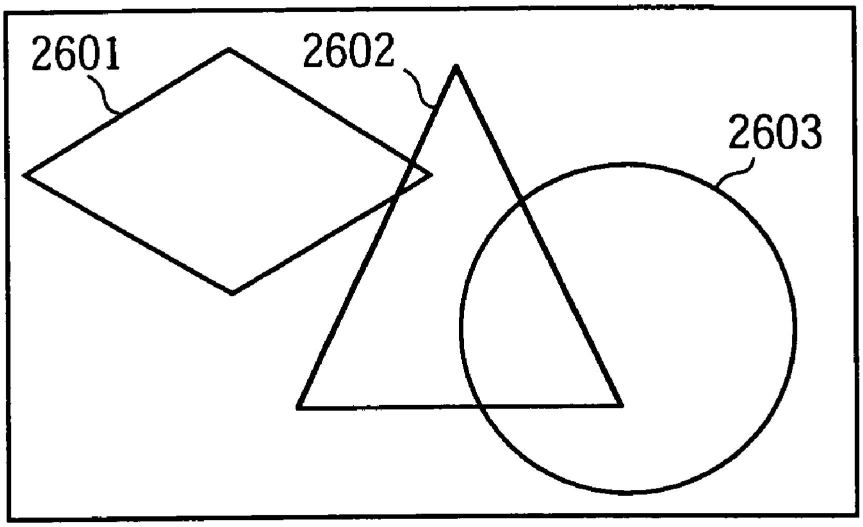
FIG. 26A shows a display on the screen when all data in the image file shown in FIG. 25 has been stored after the reception error 2504 in the image file shown in FIG. 25 has been received without an error by a re-reception or the like and updated.
Figure 26B:
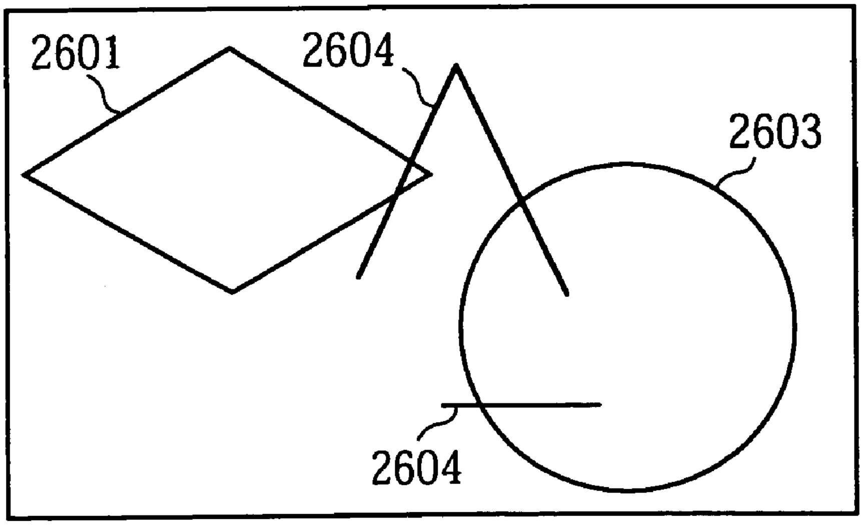
FIG. 26B shows a display on the screen when the reception error 2504 in the image file has not been stored.

FIG. 26A shows a display on the screen when all data in the image file shown in FIG. 25 has been stored after the reception error 2504 in the image file shown in FIG. 25 has been received without an error by a re-reception or the like and updated. FIG. 26B shows a display on the screen when the reception error 2504 in the image file has not been stored.

It is supposed in FIG. 25 that three images are stored. The image block 2501 corresponds to the rhombus 2601 in FIG. 26A, the image block 2502 corresponds to the triangle 2602 in FIG. 26A, and the image block 2503 corresponds to the circle 2603 in FIG. 26A.

As shown in FIG. 26B, the rhombus 2601 is displayed normally since the image block 2501 has all the data. A part in the shape 2604 is missing since the image block 2502 lacks some data due to the reception error 2504. The circle 2603 is displayed normally since the image block 2503 has all the data. As apparent from this, the present embodiment detects the position and data size of the reception error 2504, and can read the subsequent data excluding the data part corresponding to the reception error 2504.

When a part of data has not been stored when a plurality of images with different resolutions are to be stored in the order of the resolution and displayed in the order of reception, or a plurality of images are to be displayed in succession as an animated picture, a blank is displayed in correspondence to the not-stored data part and the subsequent data excluding the not-stored data part is read, as is the case where a plurality of images with transparent backgrounds are overlaid.

It should be noted here that the data having a missing part can be used in every kind of data, not limited to those cases where HTML files are displayed by HTML browsers and where image data is displayed.

Generation of File Block Notification Information

Figure 27:
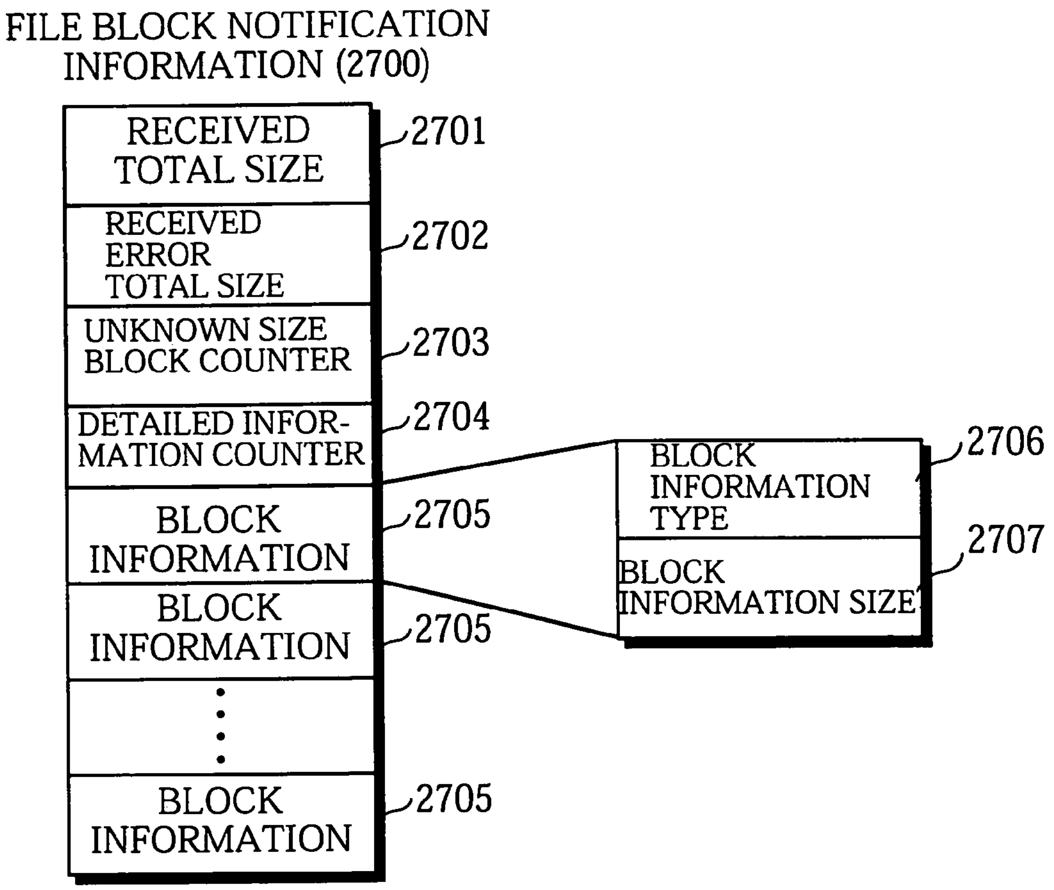
FIG. 27 shows the file block notification information which is returned, prior to the file block information, in response to a request to refer to the file block information sent from a protocol decoder or a broadcast data viewer to the broadcast data management system in the present embodiment.

FIG. 27 shows the file block notification information which is returned, prior to the file block information, in response to a request to refer to the file block information sent from a protocol decoder or a broadcast data viewer to the broadcast data management system in the present embodiment.

The file block notification information shown in FIG. 27 includes a received total size 2701, a received error total size 2702, an unknown size block counter 2703, a detailed information counter 2704, and a plurality of pieces of block information 2705.

The received total size 2701 indicates a total size of the data blocks received normally.

The received error total size 2702 indicates a total size of the data blocks not received normally, the size being detected from the received protocol information.

The unknown size block counter 2703 indicates the number of data blocks whose size is unknown since (1) a reception error has occurred and the protocol information has not been received or (2) the data has not been received.

The detailed information counter 2704 indicates the number of pieces of block information 2705.

The plurality of pieces of block information 2705 each correspond to a data block, and include a block information type 2706 and a block information size 2707.

The block information type 2706 indicates whether the block information of a corresponding data block is real data or temporary data.

The block information size 2707 indicates the data size of the block information of a corresponding data block, and is "0" when the data size is unknown.

The file block notification information 2700 shown in FIG. 27 is obtained from the file management information and the block management information shown in FIGS. 3 to 5.

Figure 28:
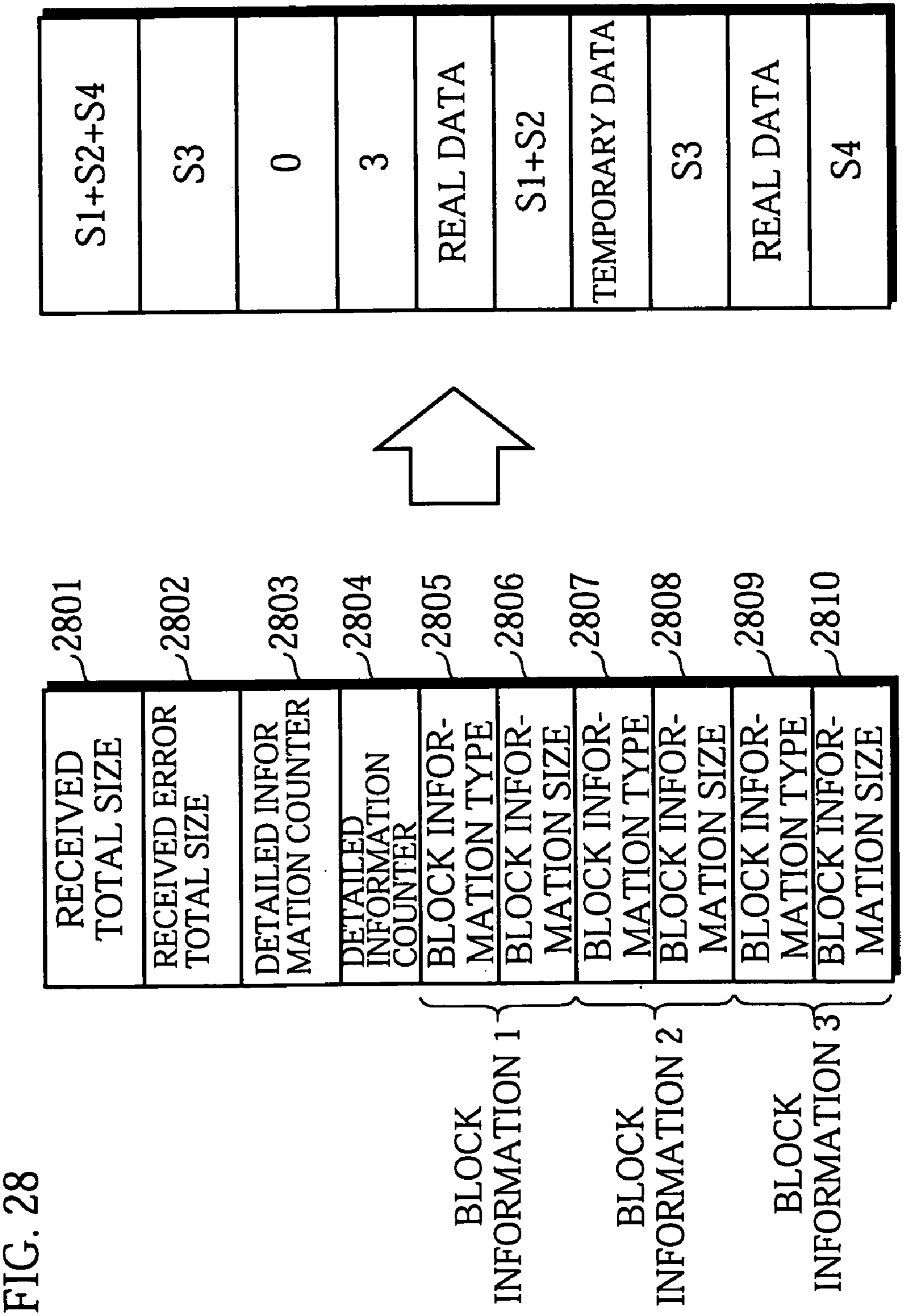
FIG. 28 shows the file block notification information obtained from the management information shown in FIG. 10.

FIG. 28 shows the file block notification information obtained from the management information shown in FIG. 10. A detailed description will be provided as follows with reference to FIGS. 10 and 28.

The received total size 2801 is "S1+S2+S4" which is obtained from the stored file size 705 in the file management information 700.

The received error total size 2802 is "S3" which is obtained from the block size 725 in the block management information 720 since only the block management information 720 among the block management information 710 to 730 is related to the temporary data.

The unknown size block counter 2803 is "0" since there is no block management information for temporary data of unknown size among the block management information 710 to 730.

The block information type 2805 shows a flag value of "real data" which is obtained from the block type 713 in the start block management information 710.

The block information size 2806 is "S1+S2" which is obtained from the block size 715 in the start block management information 710.

The block information type 2807 shows a flag value of "temporary data" which is obtained from the block type 723 in the second block management information 720.

The block information size 2808 is "S3" which is obtained from the block size 725 in the second block management information 720.

The block information type 2809 shows a flag value of "real data" which is obtained from the block type 733 in the third block management information 730.

The block information size 2810 is "S4" which is obtained from the block size 735 in the third block management information 730.

Lastly, the detailed information counter 2804 is "3" which is the number of pieces of block information currently stored.

FIG. 29 shows four examples of the file block notification information.

Now, whether referring to a file is possible will be described with reference to FIG. 29. Note that in this example, it is judged that a file can be referred to when (1) the received total size is twice the received error total size or larger, and (2) the unknown size block counter is "0", and (3) half or more data blocks have been received normally.

In the case of the first example shown in FIG. 29, the received total size is "400" which is eight times the received error total size "50". This indicates that enough data to refer to a file has been received since the value is well over the threshold, "twice". In addition, the unknown size block counter is "0" and there are only two temporary data blocks. It is judged from these conditions that a file can be referred to.

In the case of the second example shown in FIG. 29, the received total size is "40" which is far smaller than the received error total size "300", and is not enough to refer to a file. Therefore, it is judged that a file cannot be referred to.

In the case of the third example shown in FIG. 29, the received total size is "400" which is well larger than the received error total size "0" and is well over the threshold, "twice". It appears from this that enough data has been received to refer to a file. However, the unknown size block counter is "3" and the detailed information counter is "4". This indicates that reception errors have occurred to ¾ blocks. Also, the unknown size block counter is not "0" and half or more blocks have not been received without an error. Therefore, it is judged that a file cannot be referred to.

In the case of the fourth example shown in FIG. 29, the received total size is "400" which is eight times the received error total size "50". This indicates that enough data to refer to a file has been received since the value is well over the threshold, "twice". However, though the unknown size block counter is "0", there are three temporary data blocks (blocks 1, 2, and 4), indicating that reception errors have occurred to ⅗ blocks. Furthermore, more than half blocks have been received with errors. As a result, it is judged that a file cannot be referred to.

As described above, according to the present embodiment, the file block notification information is returned, prior to the file block information, in response to a request to refer to the file block information. With this construction, the protocol decoder or the broadcast data viewer having sent the request can judge whether a file can be referred to by obtaining the file block notification information prior to reception of the file block information. This deletes wasteful reading of a file when the file cannot be referred to.

Embodiment 2

Embodiment 2 of the present invention is a broadcast data reception apparatus which estimates a data size of a part excluding the protocol information of a data block judged as not having been received normally, based on a data size of a part excluding the protocol information of a data block judged as having been received normally. The broadcast data reception apparatus then secures a display area corresponding to the estimated data size. Only differences from Embodiment 1 will be described below.

Figures 30, 31:
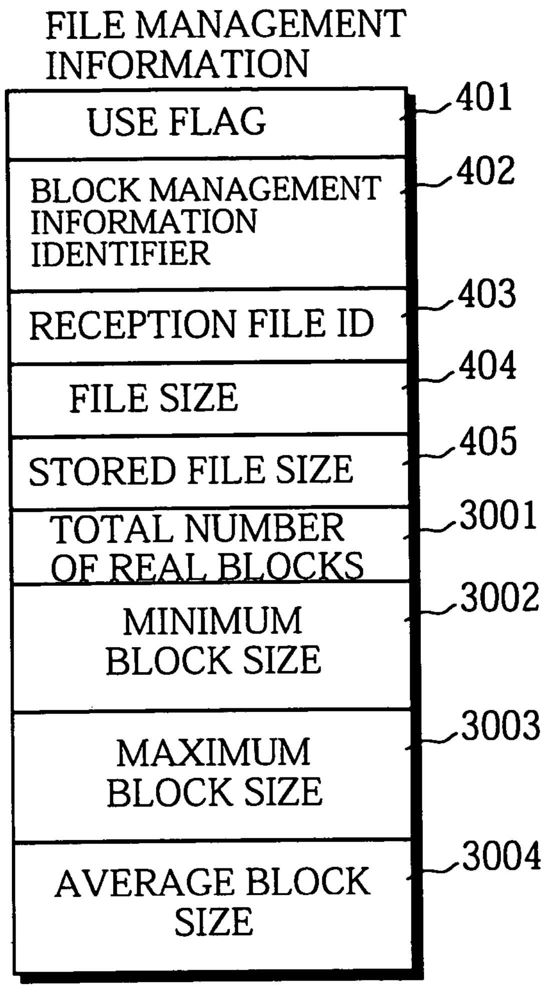
FIG. 30 shows the file management information.
FIG. 31 shows calculated results of the minimum block size, maximum block size, average block size, etc.

FIG. 30 shows the file management information.

The file management information shown in FIG. 30 includes a total number of real blocks 3001, a minimum block size 3002, a maximum block size 3003, and an average block size 3004, in addition to the contents of the file management information shown in FIG. 4.

The total number of real blocks 3001 indicates the number of data blocks received normally.

The minimum block size 3002 indicates a data size of a data block having the smallest data size among the normally received data blocks.

The maximum block size 3003 indicates a data size of a data block having the largest data size among the normally received data blocks.

The average block size 3004 indicates an average of data size of all the normally received data blocks.

For the above items in the file management information shown in FIG. 30 are calculated not using the data blocks not having been received normally due to a reception error and not using the data blocks having been re-received after having been received normally. The above items in the file management information are updated when a data block not having been received normally is received normally.

FIG. 31 shows calculated results of the minimum block size, maximum block size, average block size, etc.

The examples 1 to 3 shown in FIG. 31 includes the minimum block size, maximum block size, average block size, etc. which each have been obtained from the size of the five normally received data blocks.

The "estimated value" shown in FIG. 31 is set to a value equivalent to the average block size in this example. The estimated value indicates a temporary data size estimated when the data size is unknown due to the occurrence of a reception error. It should be noted here that the estimated value should not necessarily be the same as the average block size, but may be a value uniquely obtained using a unique arithmetic expression. The estimated value may be an intermediate value between the minimum block size and the maximum block size, for example.

The "necessary value" shown in FIG. 31 is set to a value equivalent to the maximum block size in this example. The estimated value indicates a temporary maximum data size that would be necessary when the data size is unknown due to the occurrence of a reception error. This value can be used as a temporary data size of a work area which is required for a protocol reconstruction by the protocol decoder. It should be noted here that the necessary value should not necessarily be the same as the maximum block size, but may be a value uniquely obtained using a unique arithmetic expression. The necessary value may be obtained by multiplying the maximum block size with a certain safety rate or by performing a statistical calculation, for example.

Figure 32:
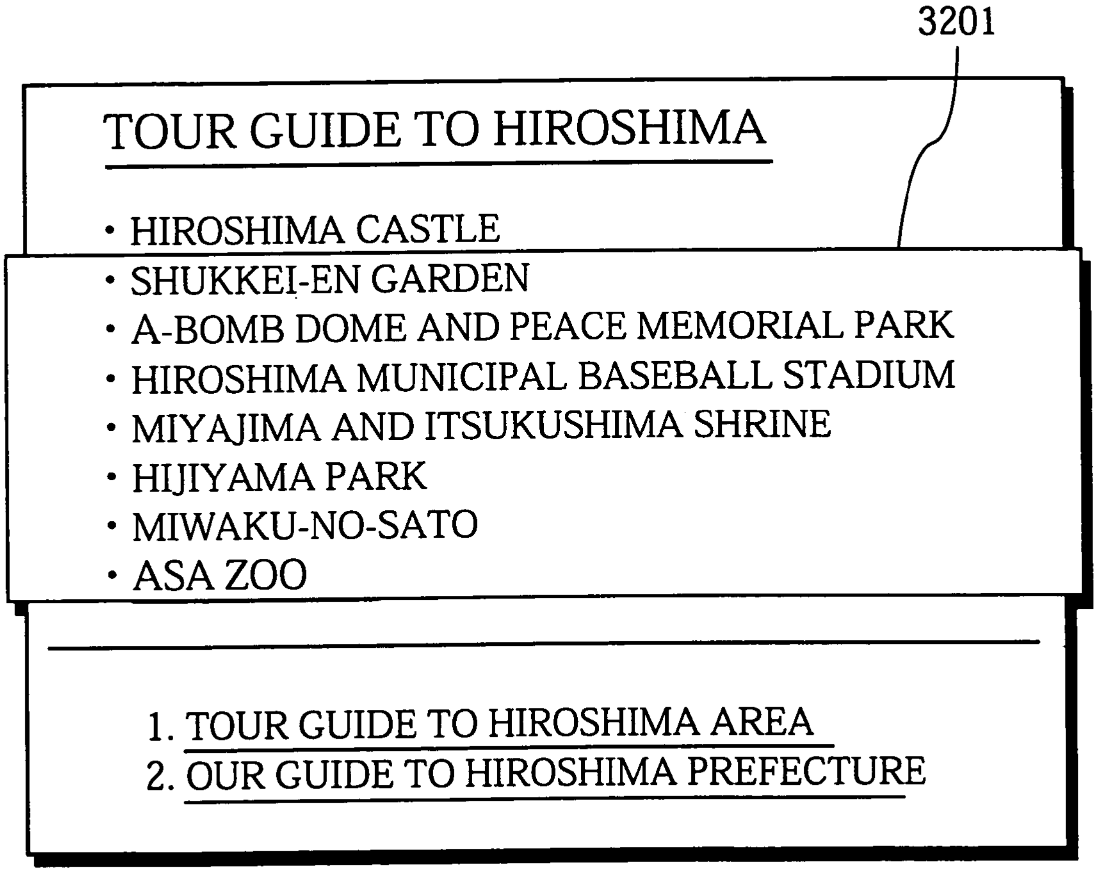
FIG. 32 shows an HTML file displayed by the broadcast data viewer of the present invention, where all the data blocks necessary for the HTML file have been received normally.
Figure 33:
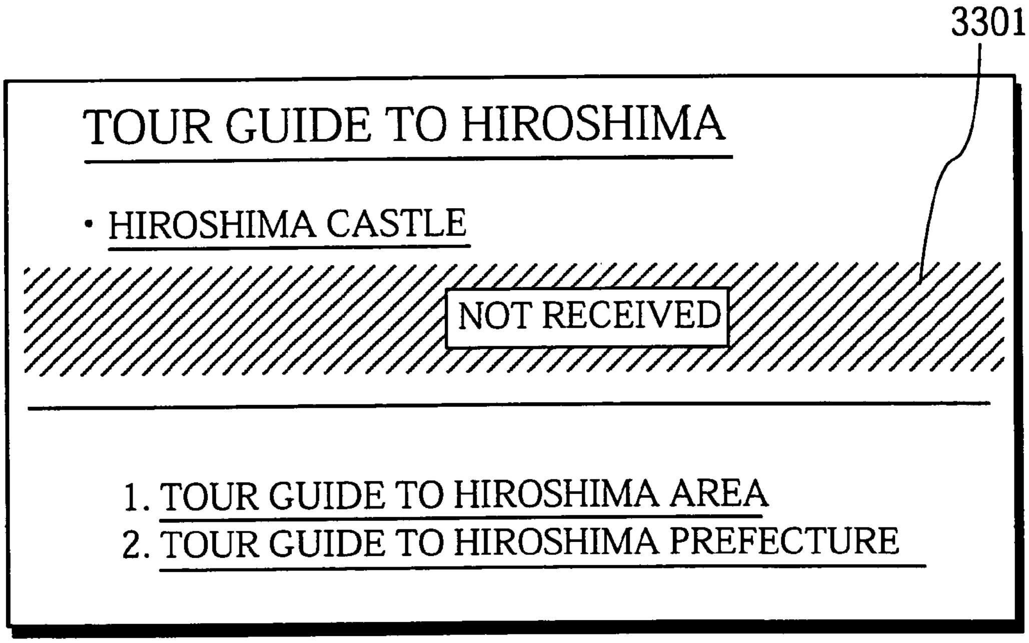
FIG. 33 shows an HTML file displayed by the broadcast data viewer of the present invention, where a data section of the HTML file has not been stored due to a reception error or the like and the data size of the not-stored part is unknown, the not-stored part not being displayed.
Figure 34:
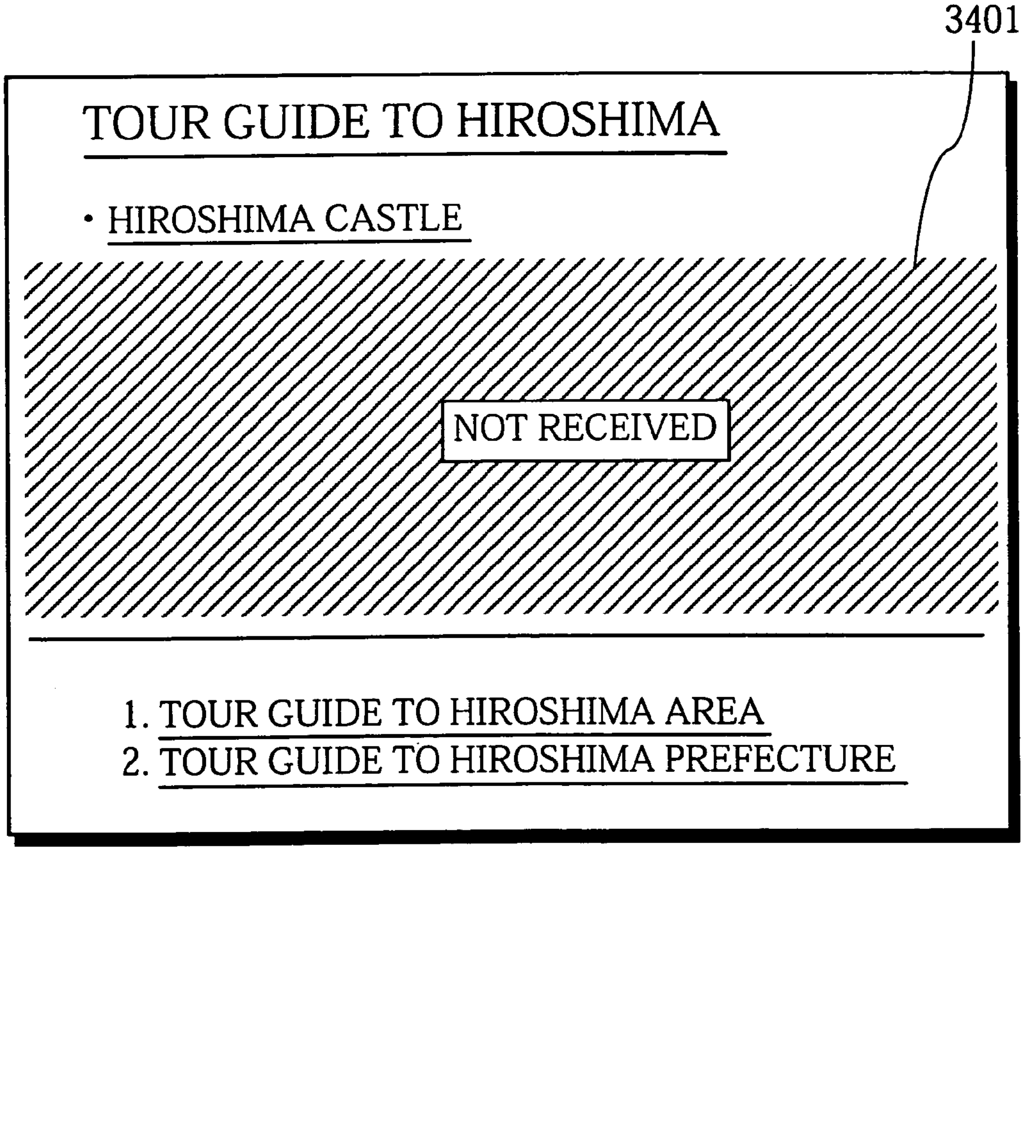
FIG. 34 shows an HTML file displayed by the broadcast data viewer of the present invention, where a data section of the HTML file has not been stored due to a reception error or the like and the data size of the not-stored part is unknown, the not-stored part not being displayed.

FIG. 32 shows an HTML file displayed by the broadcast data viewer of the present invention, where all the data blocks necessary for the HTML file have been received normally. FIGS. 33 and 34 show an HTML file displayed by the broadcast data viewer of the present invention, where a data section of the HTML file has not been stored due to a reception error or the like and the data size of the not-stored part is unknown, the not-stored part not being displayed.

The display area 3201 shown in FIG. 32 is a display part corresponding to the not-stored part in FIGS. 33 and 34.

The display area 3301 (in which "not received" is displayed) shown in FIG. 33 corresponds to the data section not having been stored due to a reception error or the like. Since the data size of the not-stored part is unknown and the size of the corresponding display area cannot be determined, the display area is assigned a predetermined size.

The display area 3401 (in which "not received" is displayed) shown in FIG. 34 also corresponds to the data section not having been stored due to a reception error or the like. In FIG. 34, however, the size of the display area corresponds to the "estimated value" obtained from the data size of other normally received data blocks.

As described above, in the broadcast data management system in the present embodiment, when an HTML file for which a data section has not been stored is to be displayed by the broadcast data viewer of the present invention, it is possible to obtain an estimated data size of the data section from the data size of other normally received data blocks, display a blank as the display area corresponding to the estimated value, and display "not received".

When a broadcast data viewer that can display received data immediately is used, the display shown in FIG. 34 can be updated to the display shown in FIG. 32 without making the user feel abnormality when normal data is received during the display of FIG. 34.

Embodiment 3

Details of Broadcast Data Viewer

Embodiment 3 of the present invention relates to a broadcast data viewer which displays incompletely reproduced broadcast data automatically or based on an instruction from the user.

Figure 35:
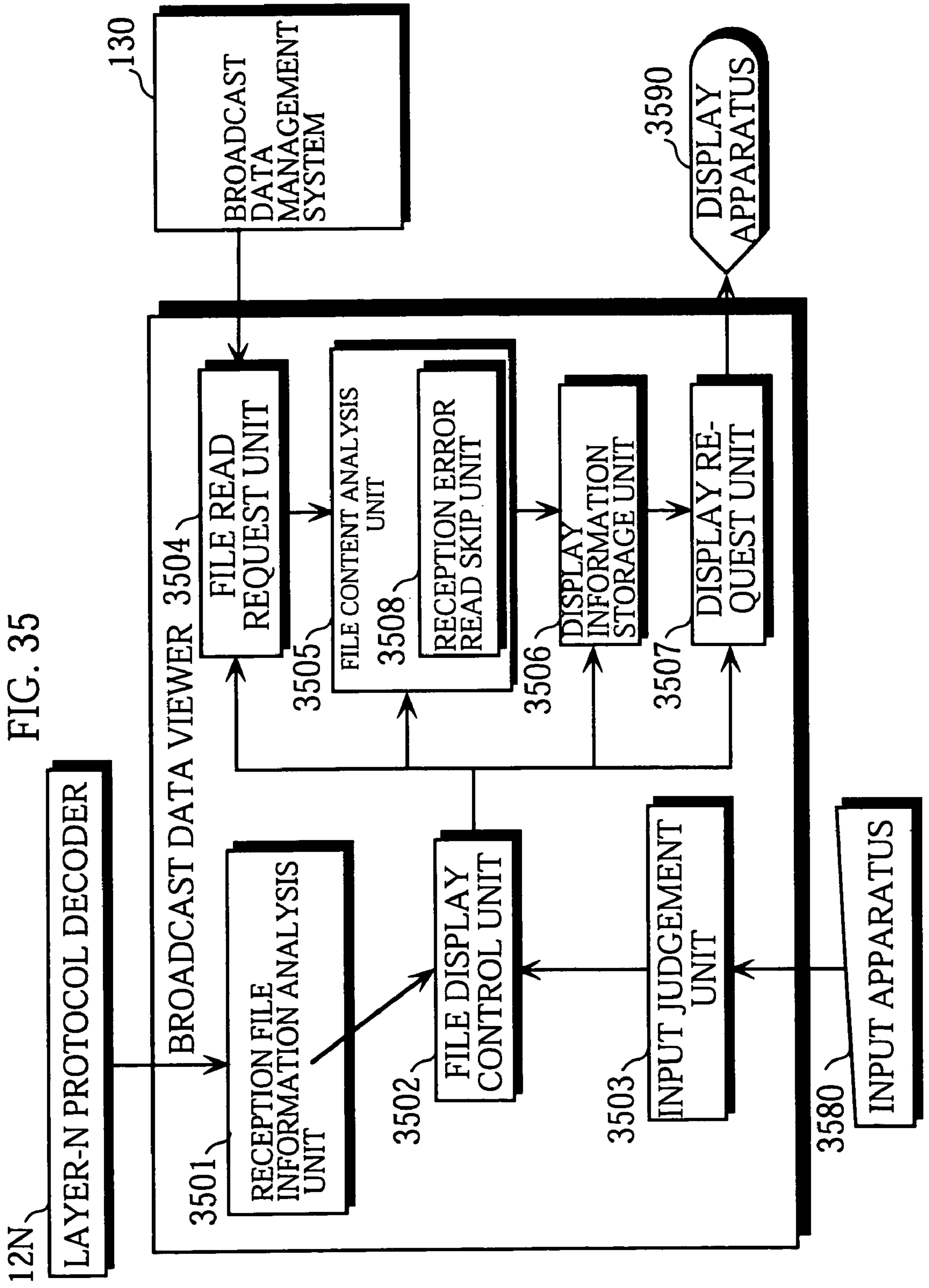
FIG. 35 shows the internal construction of a broadcast data viewer 150 of the present invention.
Figure 36:
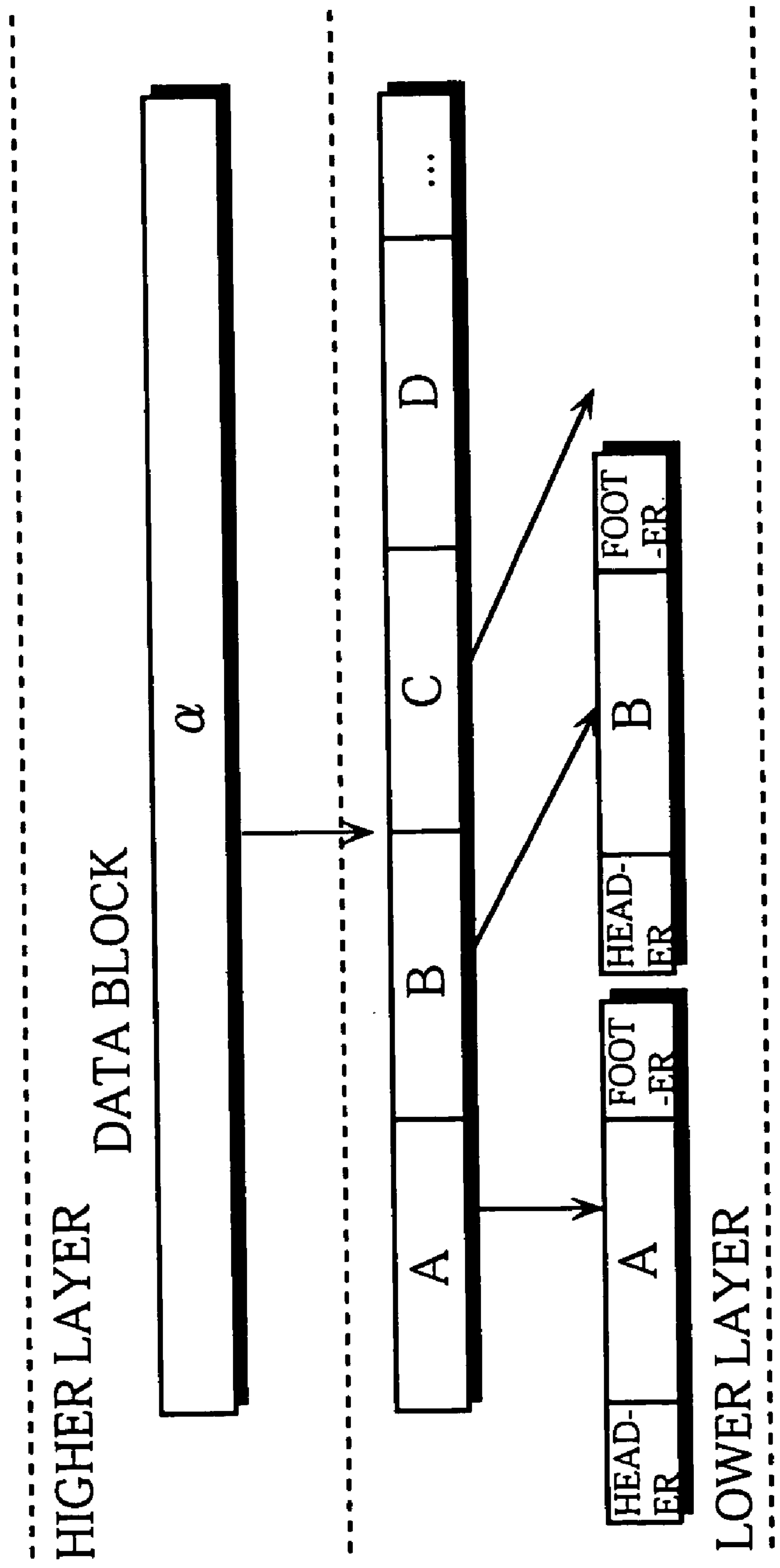
FIG. 36 shows a process in which the transmission side generates data blocks in a plurality of lower layers from a data block in a higher layer.
Figure 37:
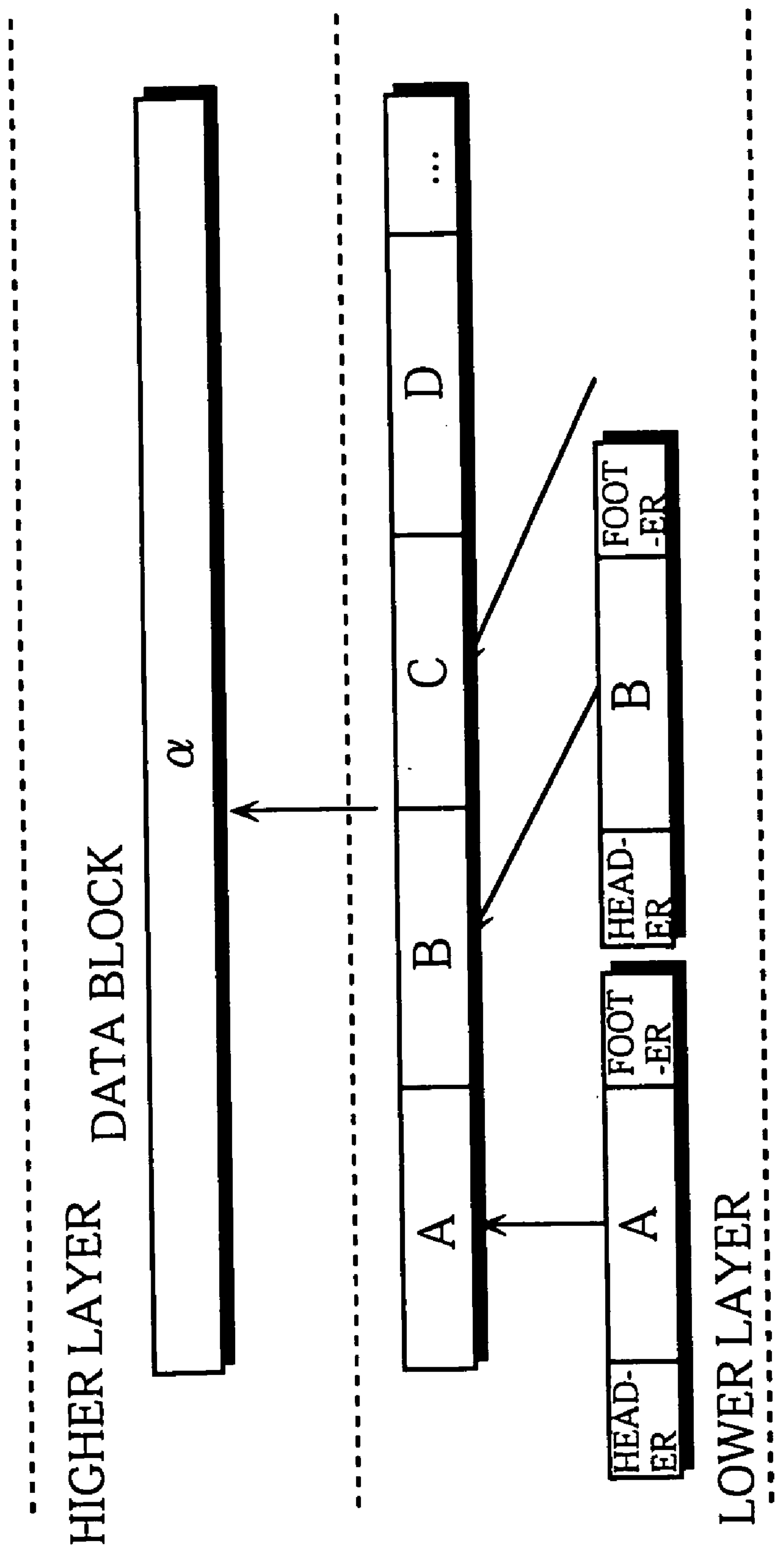
FIG. 37 shows a process in which the reception side generates a data block in a higher layer from data blocks in a plurality of lower layers.

FIG. 35 shows the internal construction of a broadcast data viewer 150 of the present invention. FIG. 35 includes the layer-N protocol decoder 12N and the broadcast data management system 130 which are shown in FIG. 1 and includes an input apparatus 3580 and a display apparatus 3590 which are not shown in FIG. 1.

Upon a receipt of an input instruction from the user via the input apparatus 3580, the broadcast data viewer 150 reads out the broadcast data from the broadcast data management system 130 and displays the read data on the display apparatus 3590. As shown in FIG. 35, the broadcast data viewer 150 includes a reception file information analysis unit 3501, a file display control unit 3502, an input judgment unit 3503, a file read request unit 3504, a file content analysis unit 3505, a display information storage unit 3506, and a display request unit 3507.

The file content analysis unit 3505 includes a reception error read skip unit 3508.

The reception file information analysis unit 3501 receives the $N^{th}$ offset information from the layer-N protocol decoder 12N, and specifies a file to be updated.

The input judgment unit 3503, when having received an input instruction from the user via the input apparatus 3580, judges based on previously set conditions, whether to display as specified in the input instruction. When having judged so, the input judgment unit 3503 instructs the file display control unit 3502 to display so by sending information related to the display to the file display control unit 3502, such as the name of the file to be displayed and the display position.

The file display control unit 3502 control the file display by sending instructions to the input judgement unit 3503, file read request unit 3504, and file content analysis unit 3505.

The file read request unit 3504 reads out data of the file to be displayed by sending a file read request to the broadcast data management system 130, and transfers the read data to the file content analysis unit 3505.

The file content analysis unit 3505 analyzes the received data of the file to be displayed, converts the data into display information such as bit map data which can be used directly by the display apparatus 3590, and stores the display information in the display information storage unit 3506. In the above conversion process, the file content analysis unit 3505 searches the file data for a reception error code which indicates a part not having been stored. When having detected the reception error code, the reception error read skip unit 3508 displays a blank at the position where the reception error code was detected, or inserts certain data into the display information so that "not received" is displayed as the display area 2301 shown in FIG. 23 or the display area 3301 shown in FIG. 33. Here, it is also possible, as the display area 3401 shown in FIG. 34, to secure a display area having a size corresponding to the size of the data not having been stored when the reception error code includes information indicating the size of the data not having been stored.

The display information storage unit 3506 stores display information as much as the capacity allows. When the display information storage unit 3506 has already stored the display information of the file to be displayed, the processes by the file read request unit 3504 and the file content analysis unit 3505 are not executed, and the existent display information is used.

The display request unit 3507 outputs display information stored in the display information storage unit 3506 to the display apparatus 3590, requesting the display information to be displayed.

The display information for which the reception error code has been detected by the file content analysis unit 3505 is stored in the display information storage unit 3506 together with information indicating the fact. The file display control unit 3502 is notified, via the reception file information analysis unit 3501, of a fact that the data corresponding to such display information has been updated. Each time the fact is notified, the file read request unit 3504 reads out the updated data, and the file content analysis unit 3505 analyzes the data and converts it into display information. In this way, the display information is updated and the display contents are updated.

As described above, the broadcast data viewer in the present embodiment can display a blank as the display area, display "not received", and update the display contents.

In the above embodiments, a data block in a higher layer is reconstructed when all pieces of protocol information necessary for it have been provided. However, the reconstruction of the data block may be performed when an instruction to display has been received from a user or when all data blocks necessary for it have been received.

Each data block is not limited to a HTML file or a data block including a data section constituting image data, but may include a data section constituting whole data corresponding to a screen of a predetermined size whole of which is either displayed at once or viewed by scrolling by a user. The screen of the predetermined size may correspond to, for example, one of (1) a file such as a HTML file including information used for referring to another file and (2) a JPEG file such as a Hyper Text file.

A program that can cause a computer to execute the operations described in the above embodiments may be recorded in a computer-readable record medium, and may be distributed in markets.

The computer-readable record medium may be, for example, a loadable/removable record medium such as a floppy disk, CD, MD, DVD, and memory card, or a record medium fixed in a computer such as a hard disk and semiconductor memory.

The present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A reception display apparatus for receiving data blocks which are repeatedly transmitted from a broadcasting station at regular intervals and displaying a screen image based on the received data blocks, each of the data blocks including a data section, and data to be displayed as the screen image being divided into a plurality of data sections, the reception display apparatus comprising:

a reception means for receiving the data blocks;

a data judgment means for judging whether the data section in each received data block is normal;

a storage means for storing every data section judged as normal by the data judgment means without storing data sections judged as abnormal;

a condition judgment means for judging, before all data sections to be displayed as the screen image are stored in the storage means, whether a condition for displaying the screen image is satisfied; and a display means for displaying, when the condition judgment means judges that the condition is satisfied, a part of the screen image using data sections currently stored in the storage means; wherein the data judgment means generates, when having judged that a data section is not normal, information indicating that the data section is abnormal, and stores the information into the storage means; and the display means displays either a blank or a notice indicating abnormality of the data section, at a position in the screen image where the data section indicated as abnormal by the information stored in the storage means should be displayed.

2. The reception display apparatus of claim 1, wherein the screen image is either displayed at once on a screen or viewed by scrolling by a user.

3. The reception display apparatus of claim 2, wherein the screen image corresponds to one of (1) a file including information used for referring to another file and (2) Hyper Text file, and the display means displays a part of the screen image using data sections of one of the file including information used for referring to another file and the Hyper Text file currently stored in the storage means.

4. A reception display apparatus for receiving data blocks which are repeatedly transmitted from a broadcasting station at regular intervals and displaying a screen image based on the received data blocks, each of the data blocks including (1) a data section constituting original data to be displayed as the screen image and (2) protocol information indicating a position of the data section in the original data, the original data being divided into a plurality of data sections, the reception display apparatus comprising:

a reception means for receiving the data blocks;

a data judgment means for judging whether the data section in each received data block is normal;

a storage means for storing (1) the protocol information included in each data block received by the reception means and (2) data sections judged as normal by the data judgment means, the storage means not storing data sections judged as abnormal, and each piece of stored protocol information showing correspondence to a data section from a same data block;

a condition judgment means for judging, before all data sections to be displayed as the screen image are stored in the storage means, whether all pieces of protocol information for the screen image have been stored in the storage means; and a display means for, when the condition judgment means judges that all pieces of protocol information for the screen image have been stored in the storage means, displaying a part of the screen image using the data sections currently stored in the storage means and all pieces of protocol information stored in the storage means.

5. The reception display apparatus of claim 4, wherein the data judgment means judges whether the protocol information in each received data block is normal and then judges for each data block that includes protocol information judged as normal whether the data section in the data block is normal, and the storage means stores every piece of protocol information judged as normal.

6. The reception display apparatus of claim 4, wherein when a data section is not stored in the storage means and a piece of protocol information corresponding to the data section is stored in the storage means, the display means displays either a blank or a notice indicating abnormality of the data section, at a position in the screen image which is indicated by the piece of protocol information.

7. The reception display apparatus of claim 4, wherein each piece of protocol information indicates a display area in the screen image corresponding to a data section included in the same data block, and the display means recognizes a display area on the screen image corresponding to a data section not stored in the storage means as a non-display area, and displays in the non-display area, which is indicated by a piece of protocol information corresponding to the data section not stored in the storage means, either a blank or information indicating that a data section has not been received normally.

8. The reception display apparatus of claim 4, wherein each piece of protocol information further indicates a data size of a data section included in the same data block, and the display means generates a non-display area at a position in the screen image where a data section not stored in the storage means should be displayed, the non-display area having a size equivalent to a data size of the data section not stored in the storage means, and the data size and the position being indicated by a piece of protocol information stored in the storage means and corresponding to the data section not stored in the storage means.

9. The reception display apparatus of claim 4, wherein the received data blocks belong to a lowest layer of a plurality of layers, the data blocks in the lowest layer being generated through the plurality of layers from the original data in a highest layer so that each data block in each layer includes (1) a data section which constitutes a data block in a next-higher layer and (2) a piece of protocol information which indicates a position of the data section included in the same data block, the highest layer not including protocol information but consisting of the original data which corresponds to the screen image, the receiving means receives each data block in the lowest layer, the data judgment means judges whether the data section in each received data block is normal, the storage means stores (1) the protocol information included in each data block received by the reception means and (2) every data section judged as normal by the data judgment means, the condition judgment means judges, before all data sections constituting a data block in a second-lowest layer are stored in the storage means, whether all pieces of protocol information necessary for the data block in the second-lowest layer have been stored in the storage means, when having judged so, reconstructs the data block in the second-lowest layer by using data sections in the lowest layer currently stored in the storage means and all corresponding pieces of protocol information in the lowest layer stored in the storage means, repeats such a reconstruction of a data block until the condition judgment means judges, before all data sections constituting the original data in the highest layer are reconstructed, that all pieces of protocol information necessary for reconstructing the original data in the highest layer have been prepared, and at this point of time, the display means displays a part of the screen image using the data sections in the second-highest layer having been reconstructed so far and the all pieces of protocol information in the second-highest layer necessary for reconstructing the original data in the highest layer.

10. The reception display apparatus of claim 9, wherein the screen image corresponds to one of (1) a file including information used for referring to another file and (2) a Hyper Text file, and the display means displays a part of the screen image using data sections of one of the file including information used for referring to another file and the Hyper Text file currently stored in the storage means.

11. The reception display apparatus of claim 4, wherein the screen image is either displayed at once on a screen or viewed by scrolling by a user.

12. A reception display method for receiving data blocks which are repeatedly transmitted from a broadcasting station at regular intervals and displaying a screen image based on the received data blocks, each of the data blocks including a data section, and data to be displayed as the screen image being divided into a plurality of data sections, the reception display method comprising:

a reception step for receiving the data blocks;

a data judgment step for judging whether the data section in each received data block is normal;

a storage step for storing every data section judged as normal in the data judgment step without storing data sections judged as abnormal;

a condition judgment step for judging, before all data sections to be displayed as the screen image are stored, whether a condition for displaying the screen image is satisfied; and a display step for, when the condition judgment step judges that the condition is satisfied, displaying a part of the screen image using currently stored data sections; wherein the data judgment step generates, when having judged that a data section is not normal, information indicating that the data section is abnormal, and stores the information; and the display step displays either a blank or a notice indicating abnormality of the data section, at a position in the screen image where the data section indicated as abnormal by the stored information should be displayed.

13. A reception display method for receiving data blocks which are repeatedly transmitted from a broadcasting station at regular intervals and displaying a screen image based on the received data blocks, each of the data blocks including (1) a data section constituting original data to be displayed as the screen image and (2) protocol information indicating a position of the data section in the original data, the original data being divided into a plurality of data sections, the reception display method comprising:

a reception step for receiving the data blocks;

a data judgment step for judging whether the data section in each received data block is normal;

a storage step for storing (1) the protocol information included in each data block received in the reception step and (2) data sections judged as normal in the data judgment step, the storage step not storing data sections judged as abnormal, and each piece of stored protocol information showing correspondence to a data section from a same data block;

a condition judgment step for judging, before all data sections to be displayed as the screen image are stored, whether all pieces of protocol information for the screen image have been stored; and a display step for, when the condition judgment step judges that all pieces of protocol information for the screen image have been stored, displaying a part of the screen image using the currently stored data sections and all pieces of stored protocol information.

14. A computer-readable record medium recording a reception display program for receiving data blocks which are repeatedly transmitted from a broadcasting station at regular intervals and displaying a screen image based on the received data blocks, each of the data blocks including a data section, and data to be displayed as the screen image being divided into a plurality of data sections, the reception display program causing a computer to execute;

a reception step for receiving the data blocks;

a data judgment step for judging whether the data section in each received data block is normal;

a storage step for storing every data section judged as normal in the data judgment step without storing data sections judged as abnormal;

a condition judgment step for judging, before all data sections to be displayed as the screen image are stored, whether a condition for displaying the screen image is satisfied; and a display step for, when the condition judgment step judges that the condition is satisfied, displaying a part of the screen image using currently stored data sections; wherein the data judgment step generates, when having judged that a data section is not normal, information indicating that the data section is abnormal, and stores the information; and the display step displays either a blank or a notice indicating abnormality of the data section, at a position in the screen image where the data section indicated as abnormal by the stored information should be displayed.

15. A computer-readable record medium recording a reception display program for receiving data blocks which are repeatedly transmitted from a broadcasting station at regular intervals and displaying a screen image based on the received data blocks, each of the data blocks including (1) a data section constituting original data to be displayed as the screen image and (2) protocol information indicating a position of the data section in the original data, the original data being divided into a plurality of data sections, the reception display program causing a computer to execute:

a reception step for receiving the data blocks;

a data judgment step for judging whether the data section in each received data block is normal;

a storage step for storing (1) the protocol information included in each data block received in the reception step and (2) data sections judged as normal in the data judgment step, the storage step not storing data sections judged as abnormal, and each piece of stored protocol information showing correspondence to a data section from a same data block;

a condition judgment step for judging, before all data sections to be displayed as the screen image are stored, whether all pieces of protocol information for the screen image have been stored; and a display step for, when the condition judgment step judges that all pieces of protocol information for the screen image have been stored, displaying a part of the screen image using the currently stored data sections and all pieces of stored protocol information.

* * * * *